US009957354B2

(12) United States Patent
Müller et al.

(10) Patent No.: US 9,957,354 B2
(45) Date of Patent: May 1, 2018

(54) HIGHER FUNCTIONAL POLYETHER CARBONATE POLYOLS OBTAINED USING BRANCHING MOLECULES

(71) Applicant: Covestro Deutschland AG, Leverkusen (DE)

(72) Inventors: Thomas E. Müller, Aachen (DE); Christoph Gürtler, Köln (DE); Muhammad A. Subhani, Aachen (DE); Burkhard Köhler, Zierenberg (DE); Walter Leitner, Aachen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days. days.

(21) Appl. No.: 14/915,687

(22) PCT Filed: Sep. 1, 2014

(86) PCT No.: PCT/EP2014/068515
§ 371 (c)(1),
(2) Date: Mar. 1, 2016

(87) PCT Pub. No.: WO2015/032720
PCT Pub. Date: Mar. 12, 2015

(65) Prior Publication Data
US 2016/0194444 A1    Jul. 7, 2016

(30) Foreign Application Priority Data

Sep. 5, 2013    (EP) ..................................... 13183200

(51) Int. Cl.
C08G 65/26    (2006.01)
C08G 64/34    (2006.01)
C08G 18/79    (2006.01)
C08G 18/44    (2006.01)

(52) U.S. Cl.
CPC ......... C08G 65/2663 (2013.01); C08G 18/44 (2013.01); C08G 18/792 (2013.01); C08G 64/34 (2013.01); C08G 65/2603 (2013.01); C08G 65/2696 (2013.01)

(58) Field of Classification Search
CPC ............ C08G 65/2603; C08G 65/2663; C08G 65/2696; C08G 65/02; C08G 65/16
See application file for complete search history.

(56) References Cited

U.S. PATENT DOCUMENTS

| 3,404,109 | A |   | 10/1968 | Milgrom |
|---|---|---|---|---|
| 3,699,079 | A | * | 10/1972 | Hayne ................. C08G 64/0208 106/10 |
| 3,829,505 | A |   | 8/1974 | Herold |
| 3,941,849 | A |   | 3/1976 | Herold |
| 4,789,727 | A | * | 12/1988 | Sun ........................ C08G 64/34 528/405 |
| 5,158,922 | A |   | 10/1992 | Hinney et al. |
| 5,470,813 | A |   | 11/1995 | Le-Khac |
| 6,767,986 | B2 |   | 7/2004 | Moethrath et al. |
| 6,780,813 | B1 |   | 8/2004 | Hofmann et al. |
| 6,835,687 | B2 |   | 12/2004 | Hofmann et al. |
| 7,008,900 | B1 |   | 3/2006 | Hofmann et al. |
| 8,324,419 | B2 |   | 12/2012 | Mijolovic et al. |
| 2010/0048935 | A1 |   | 2/2010 | Mijolovic et al. |
| 2012/0065360 | A1 | * | 3/2012 | Jeong ..................... C08G 64/34 528/366 |
| 2015/0259475 | A1 |   | 9/2015 | Müller et al. |

FOREIGN PATENT DOCUMENTS

| EP | 0700949 A2 | 3/1996 |
|---|---|---|
| EP | 0743093 A1 | 11/1996 |
| EP | 0761708 A2 | 3/1997 |
| EP | 1359177 A1 | 11/2003 |
| EP | 2888309 A1 | 7/2015 |
| JP | 4145123 A | 5/1992 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-01/80994 A1 | 11/2001 |
| WO | WO-2006/103213 A1 | 10/2006 |
| WO | WO-2008092767 A1 | 8/2008 |
| WO | WO-2010028362 A1 | 3/2010 |

(Continued)

OTHER PUBLICATIONS

International Search Report for PCT/EP2014/068515 dated Feb. 6, 2015.

*Primary Examiner* — Michael L Leonard
(74) *Attorney, Agent, or Firm* — K&L Gates LLP

(57) ABSTRACT

The present invention relates to a method for producing higher functional polyether carbonate polyols, said method preferably comprising the steps of ([alpha]) providing a DMC catalyst and; ([alpha][alpha]) a suspending agent that does contain any H-functional groups and/or ([alpha][beta]) an H-functional starter compound ([beta]) adding carbon dioxide and at least one alkylene oxide ([gamma]) adding carbon dioxide and at least two alkylene oxides, wherein these alkylene oxides can be the same as or different from the alkylene oxide or alkylene oxides added in step ([beta]), and ([delta]) adding carbon dioxide and at least one alkylene oxide, wherein this alkylene oxide or these alkylene oxides can be the same as or different from the alkylene oxides added in steps ([beta]) and ([gamma]), at least one of the alkylene oxides in step ([gamma]) having an epoxy functionality of >=2 and, in addition, in the case that no H-functional starter compound is provided in ([alpha]), step ([delta]) includes the addition of an H-functional starter compound.

16 Claims, No Drawings

(56) References Cited

FOREIGN PATENT DOCUMENTS

| | | |
|---|---|---|
| WO | WO-2012033375 A2 | 3/2012 |
| WO | WO-2014033071 A1 | 3/2014 |

* cited by examiner

HIGHER FUNCTIONAL POLYETHER CARBONATE POLYOLS OBTAINED USING BRANCHING MOLECULES

CROSS REFERCE TO RELATED APPLICATIONS

This application is a national stage application (under 35 U.S.C. § 371 ) of PCT/EP2014/068515, filed Sep. 1, 2014, which claims benefit of European Application No. 13183200.8, filed Sep. 5, 2013, both of which are incorporated herein by reference in their entirety.

The present invention relates to a process for preparing polyethercarbonate polyols of relatively high functionality, comprising preferably the steps of (α) initially introducing a suspension medium which contains no H-functional groups and/or an H-functional starter compound and a DMC catalyst, (β) metering in at least one alkylene oxide and carbon dioxide, (γ) metering in carbon dioxide and at least two alkylene oxides, it being possible for these alkylene oxides to be the same as or different from the alkylene oxide or alkylene oxides metered in step (β), and (δ) metering in at least one alkylene oxide and carbon dioxide, it being possible for this or these alkylene oxide(s) to be the same as or different from the alkylene oxides metered in step (β) and (γ), and at least one of the alkylene oxides in step (γ) having an epoxy functionality of ≥2.

BACKGROUND OF THE INVENTION

As well as having a tailored functionality, modern plastics are also intended to do increased justice to environmental concerns. As well as by a general optimization of preparation processes, this can also be achieved through the use of greenhouse gases, such as carbon dioxide, as building blocks for the synthesis of polymers. Accordingly, for example, a better environmental balance for the process can be obtained overall via the fixing of carbon dioxide. This path is being followed in the area of the production of polyethercarbonates, and has been a topic of intense research for more than 40 years (e.g., Inoue et al, Copolymerization of Carbon Dioxide and Alkylenoxide with Organometallic Compounds; Die Makromolekulare Chemie 130, 210-220, 1969). In one possible preparation variant, polyethercarbonate polyols are obtained by a catalytic reaction of alkylene oxides and carbon dioxide in the presence of H-functional starter compounds ("starters"). A general reaction equation for this is given in scheme (I):

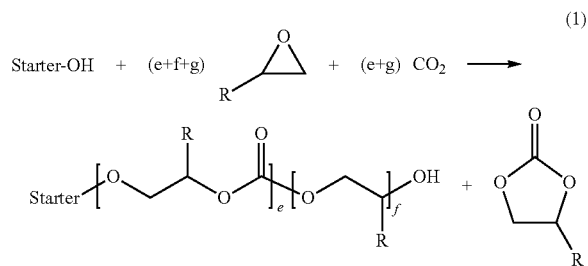

A further product, in this case an unwanted byproduct, arising alongside the polyethercarbonate polyol is a cyclic carbonate (for example, for R=CH$_3$, propylene carbonate).

The literature describes a number of different preparation variants. For example, US 20100048935 A1 describes a process for the preparation of polyethercarbonate polyols by reaction of alkylene oxides and carbon dioxide with H-functional starter compounds by means of a DMC catalyst, wherein one or more starter compounds are initially introduced in a reactor and additionally one or more starter compounds are metered in continuously in the course of the reaction. Epoxidized soyabean oil is mentioned as a possible alkylene oxide. The reactivity of these oxirane rings, however, is low, since they are inside a chain and are greatly sterically shielded. Accordingly, the epoxidized soyabean oil is reacted more slowly than customary monomers, such as propylene oxide, and accumulates in the reaction mixture. Since, moreover, epoxidized soyabean oil constitutes a mixture of multiply epoxidized compounds, the controlled construction of defined polymer architectures is not possible.

WO 2006/103213 A1, in contrast, describes a process for the preparation of polyethercarbonate polyols with improved incorporation of CO$_2$ into the polyethercarbonate polyol, using a catalyst featuring a multimetal cyanide. The specification discloses the presence of an H-functional starter, an alkylene oxide, and carbon dioxide in the presence of the multimetal cyanide component in a reactor. The document further discloses the presence of a CO$_2$-philic substance or of CO$_2$-philic substituents. The CO$_2$-philic substance or the CO$_2$-philic substituent is said to facilitate the incorporation of the CO$_2$ into the polyethercarbonate polyol and thereby to reduce the formation of cyclic alkylene carbonates, such as propylene carbonate, for example, which represent unwanted byproducts.

WO 2012/033375 A2 discloses a process for the preparation of crosslinked polycarbonate polyols by alternating addition of carbon dioxide and alkylene oxides onto H-functional starter compounds in the presence of a catalyst.

U.S. Pat. No. 3,699,079 A discloses a process for the preparation of copolymers from carbon dioxide and diepoxides in the presence of a catalyst system.

Furthermore, however, it may be desirable also to obtain polyethercarbonate polyols of relatively high functionality which have a viscosity suitable for further processing and have a relatively high number of reactive, terminal groups. These polymers may advantageously also be of branched construction and in further crosslinking reactions may lead to crosslinked polyethercarbonate polymers which feature improved molding or film qualities.

In principle it is also possible to obtain polyethercarbonate polyols of relatively high functionality by using oligomeric multifunctional starter molecules, usually with functional OH groups. The viscosity of the products obtained in such a way, however, is frequently heightened. Furthermore, such starters must often be synthesized in a separate step. The synthesis of the starters usually entails using bases as catalyst. Before these starters are used in a catalysis with DMC catalysts, they must be purified, at cost and inconvenience, to remove basic catalyst residues. The use of low molecular mass multifunctional starter molecules results in a reduced activity or even in complete inhibition of the DMC catalyst. It is therefore necessary to use high concentrations of catalyst or to accept long reaction times. For a given OH number, polyethercarbonate polyols prepared with multifunctional starter molecules have a viscosity which increases in line with the functionality. Accordingly, EP 12181907.2-1301, for a polyethercarbonate obtained using glycerol as trifunctional starter, describes a significantly increased viscosity (36.0 Pa·s) in comparison with a polyethercarbonate obtained using dipropylene glycol as difunctional starter (4.1 Pa·s).

BRIEF SUMMARY OF THE INVENTION

The object of the present invention, accordingly, was to provide a cost-effective and efficient process for preparing polyethercarbonate polyols of relatively high functionality from H-functional starter compounds, alkylene oxides, $CO_2$, and also alkylene oxides having an epoxy functionality of ≥2, the intention being that in comparison with linear polyethercarbonate polyols, the polyethercarbonate polyols of relatively high functionality should exhibit a low viscosity and a high reactivity of the end groups. It is the object of the present invention, furthermore, to show a new use of these polyethercarbonate polyols of relatively high functionality as low-viscosity, high-reactivity building blocks for the preparation of polyurethanes.

The object is achieved by a process for preparing polyethercarbonate polyols of relatively high functionality by reaction of at least two alkylene oxides and carbon dioxide with H-functional starter compounds, characterized in that at least one of the alkylene oxides has an epoxy functionality of ≥2.

DETAILED DESCRIPTION OF THE INVENTION

The process preferably comprises the following steps:
(α) initially introducing a double metal cyanide catalyst and
  (αα) a suspension medium that contains no H-functional groups, and/or
  (αβ) an H-functional starter compound,
(γ) metering in carbon dioxide and at least two alkylene oxides, and
(δ) metering in carbon dioxide and at least one alkylene oxide, it being possible for this or these alkylene oxide(s) to be the same as or different from the alkylene oxides metered in step (γ),
at least one of the alkylene oxides in step (γ) having an epoxy functionality of ≥2, and
in the event that no H-functional starter compound was introduced in step (α), step (δ) comprising the metering of an H-functional starter compound.

It is further preferred for the process to comprise the following step (β) between step (α) and step (γ):
(β) metering in carbon dioxide and at least one alkylene oxide,
it being possible, furthermore, for the at least two alkylene oxides metered in step (γ) to be the same as or different from the alkylene oxide or alkylene oxides metered in step (β), and it being possible for the alkylene oxide(s) metered in step (δ) to be the same as or different from the alkylene oxides metered in step (β) and (γ).

Surprisingly it has been found that this process regime leads to efficient incorporation of an alkylene oxide having an epoxy functionality of ≥2 into a growing polymer chain, which then links to further polymer chains while retaining the functional end groups. In this way, higher-functionality polyethercarbonate polyols are obtained, with an increased number of functional end groups per molecule (average OH functionality), with the same number of functional groups per unit weight of polymer. The incorporation of alkylene oxides with a functionality of two or more leads in each case to a branching of the growing polymer chain. Alkylene oxides with a functionality of two or more are therefore referred to below as branching agent molecules. In this way, polyethercarbonate polyols of reproducibly higher functionality, having a defined functionality F, are obtainable that are suitable particularly for use in further crosslinking reactions.

In comparison to linear polyethercarbonate polyols and to polyethercarbonate polyols obtained only using starter compounds of relatively high functionality, the higher-functionality polyethercarbonate polyols of the invention exhibit a lower viscosity for a given OH number, thereby generally improving the technical handling properties. The higher-functionality polyethercarbonate polyols obtainable by the process of the invention can therefore be processed particularly effectively, especially by reaction with di- and/or polyisocyanates to give polyurethanes, more particularly to give flexible polyurethane foams, rigid polyurethane foams, polyurethane elastomers, or polyurethane coatings.

Another characteristic of the higher-functionality polyethercarbonate polyols prepared in accordance with the invention is preferably that they also contain ether groups between the carbonate groups. In terms of formula (Ia) this means that the e/f ratio is preferably from 2:1 to 1:20, more preferably from 1.5:1 to 1:10.

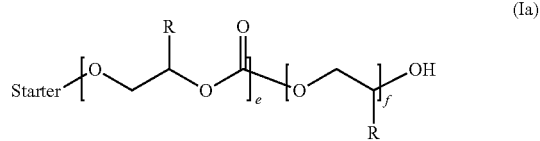

(Ia)

The functionality in the sense of the invention refers to the average number of functional groups per molecule. "Higher-functionality" polyethercarbonate polyols, or polyethercarbonate polyols of relatively high functionality, in the sense of the present invention are polyethercarbonate polyols in which the average number of OH groups per polymer chain (average OH functionality) is at least 2. The average OH functionality is preferably in the range 2<F≤22, more preferably 2<F≤12, and very preferably 2<F≥8. The functionality of the higher-functionality polyethercarbonate polyols is a product of the molar ratio and the functionality of the starter molecules and branching agent molecules used. Where bifunctional starters are used in combination with bifunctional branching agent molecules, the average functionality can be calculated according to the following formula $$F = \frac{n_S \cdot F_S}{[n_S - n_{CL}]} \quad (II)$$

where
$F_{avg}$ stands for the average functionality of the polyethercarbonate polyol,
$n_S$ stands for the molar amount of starter molecules,
$F_s$ stands for the functionality of the starter molecule, and
$n_{CL}$ stands for the molar amount of branching agent molecules.

The average functionality may also be determined experimentally by means, for example, of two-dimensional liquid chromatography, where the molecules are separated first according to their molecular weight and then according to the interaction between the OH groups and the column material. It is likewise possible for the average functionality to be determined by mass spectroscopy, with comparison between the spectra before and after derivatization of the OH groups. For example, the OH groups may be derivatized by replacement of the protons with deuterium ions or by methylation. For molecules having a functionality of 4, for example, derivatization via proton replacement by deuterium ions increases the mass by four Da, and in the case of derivatization by methylation, by 4×14=56 Da. The average functionality is a product of the average number of OH groups per molecule.

Generally speaking, for the process of the invention, where higher-functionality alkylene oxides (epoxides) are not needed, those with 2-45 carbon atoms can be used. The alkylene oxides having 2-45 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, singly epoxidized fats in the form of mono-, di-, and triglycerides, singly epoxidized fatty acids, C1-C24 esters of singly epoxidized fatty acids, singly epoxidized derivatives of glycidol such as, for example, methyl glycidyl ether, ethyl glycidyl ether, 2-ethylhexyl glycidyl ether, allyl glycidyl ether, glycidyl methacrylate, and also epoxy-functional alkoxysilanes such as, for example, 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preferred for use as alkylene oxide are ethylene oxide and/or propylene oxide, especially propylene oxide.

Alkylene oxides having an epoxy functionality of ≥2 (branching agent molecules) in the sense of the invention are double and multiple alkylene oxides, such as multiply epoxidized aliphatic or cycloaliphatic compounds having at least two olefinic double bonds, or multiple glycidyl ethers of diols, polyols, bisphenols, aromatic compounds having more than two hydroxyl groups, and also the multiple glycidyl esters of aliphatic or aromatic dicarboxylic acids and polycarboxylic acids. The epoxy functionality is usefully ≥2 and ≤20, preferably ≥2 and ≤10, and more preferably ≥2 and ≤4.

As suitable H-functional starter compounds (starters) it is possible to use compounds having H atoms that are active in respect of the alkoxylation. Groups which have active H atoms and are active in respect of the alkoxylation are, for example, —OH, —NH$_2$ (primary amines), —NH— (secondary amines), —SH and —CO$_2$H, preferably —OH and —NH$_2$, especially preferably —OH. The compounds employed as H-functional starter compound are, for example, one or more compounds selected from the group consisting of mono- or polyhydric alcohols, polyfunctional amines, polyfunctional thiols, amino alcohols, thio alcohols, hydroxy esters, polyether polyols, polyester polyols, polyesterether polyols, polyethercarbonate polyols, polycarbonate polyols, polycarbonates, polyethylenimines, polyetheramines (e.g., so-called Jeffamines® from Huntsman, such as e.g. D-230, D-400, D-2000, T-403, T-3000, T-5000 or corresponding products from BASF, such as e.g. Polyetheramine D230, D400, D200, T403, T5000), polytetrahydrofurans (e.g., PolyTHF® from BASF, such as e.g. PolyTHF® 250, 650S, 1000, 1000S, 1400, 1800, 2000), polytetrahydrofuranamines (BASF product Polytetrahydrofuranamine 1700), polyetherthiols, polyacrylate polyols, castor oil, the mono- or diglyceride of ricinoleic acid, monoglycerides of fatty acids, chemically modified mono-, di- and/or triglycerides of fatty acids, and C1-C24 alkyl fatty acid esters which contain on average at least 2 OH groups per molecule. The C1-C24 alkyl fatty acid esters which contain on average at least 2 OH groups per molecule are, by way of example, commercial grades such as Lupranol Balance® (from BASF AG), Merginol® grades (from Hobum Oleochemicals GmbH), Sovermol® grades (from Cognis Deutschland GmbH & Co. KG), and Soyol® ™ grades (from USSC Co.).

The monofunctional starter compounds used may be alcohols, amines, thiols and carboxylic acids. The monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. The monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols with suitability as H-functional starter compounds are, for example, dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentantanediol, methylpentanediols (such as, for example, 3-methyl-1,5-pentanediol), 1,6-hexanediol; 1,8-octanediol, 1,10-decanediol, 1,12-dodecanediol, bis(hydroxymethyl)cyclohexanes (such as, for example, 1,4-bis(hydroxymethyl) cyclohexane), triethylene glycol, tetraethylene glycol, polyethylene glycols, dipropylene glycol, tripropylene glycol, polypropylene glycols, dibutylene glycol, and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolysates, cellulose, cellulose hydrolysates, hydroxy-functionalized fats and oils, especially castor oil), and also all products of modification of these aforementioned alcohols with different amounts of ε-caprolactone.

The H-functional starter compounds may also be selected from the class of the polyether polyols, especially from those having a molecular weight $M_n$ in the range from 100 to 4000 g/mol. Preference is given to polyether polyols formed from repeating ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide. Suitable polyether polyols, formed from repeating propylene oxide and/or ethylene oxide units, are, for example, the Desmopheno®, Acclaim®, Arcol®, Baycoll®, Bayfill®, Bayflex®, Baygal®, PET®, and polyether polyols from Bayer MaterialScience AG (such as, for example, Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are, for example, the Pluriol® E products from BASF SE, suitable homopolypropylene oxides are, for example, Pluriol® P products from BASF SE; suitable mixed copolymers of ethylene oxide and propylene oxide are, for example, the Pluronic® PE or Pluriol® RPE products from BASF SE.

The H-functional starter compounds may also be selected from the class of the polyester polyols, more particularly from those having a molecular weight Mn in the range from 200 to 4500 g/mol. The polyester polyols used are at least difunctional polyesters. Preferably, polyester polyols consist of alternating acid and alcohol units. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the stated acids and/or anhydrides. Examples of alcohol components used include ethanediol, 1,2-propanediol, 1,3-propanediol, 1,4-butanediol, 1,5-pentanediol, neopentyl glycol, 1,6-hexanediol, 1,4-bis(hydroxymethyl) cyclohexane, diethylene glycol, dipropylene glycol, trimethylolpropane, glycerol, pentaerythritol, or mixtures of the stated alcohols. Where dihydric or polyhydric polyether polyols are used as alcohol component, the products are polyesterether polyols which can likewise be used as starter compounds for preparing the polyethercarbonate polyols. Preference is given to using polyether polyols with $M_n$=150 to 2000 g/mol for preparation of the polyesterether polyols.

As H-functional starter compounds it is possible, furthermore, to use polycarbonate diols, more particularly those having a molecular weight $M_n$ in the range from 150 to 4500 g/mol, preferably 500 to 2500 g/mol, which are prepared, for example, by reaction of phosgene, dimethyl carbonate, diethyl carbonate or diphenyl carbonate with difunctional alcohols or polyester polyols or polyether polyols. Examples relating to polycarbonates are found for example in EP-A 1359177. As polycarbonate diols it is possible for example to use the Desmophen® C grades from Bayer MaterialScience AG, such as Desmophen® C 1100 or Desmophen® C 2200, for example.

In a further embodiment of the invention, polyethercarbonate polyols can be used as H-functional starter compounds. Used more particularly are polyethercarbonate polyols which are obtainable by the process of the invention as described herein. These polyethercarbonate polyols used as H-functional starter compounds are for this purpose prepared beforehand in a separate reaction step.

The H-functional starter compounds generally have an OH functionality (i.e., number of polymerization-active H atoms per molecule) of 1 to 8, preferably of 2 to 6, and more preferably of 2 to 4. The H-functional starter compounds are used either individually or as a mixture of at least two H-functional starter compounds.

Preferred H-functional starter compounds are alcohols of the general formula

HO—(CH$_2$)$_x$—OH (III)

where x is a number from 1 to 20, preferably an integer from 2 to 20. Examples of alcohols of the formula above are ethylene glycol, 1,4-butanediol, 1,6-hexanediol, 1,8-octanediol, 1,10-decanediol, and 1,12-dodecanediol. Further preferred H-functional starter compounds are neopentyl glycol, trimethylolpropane, glycerol, pentaerythritol, reaction products of the alcohols of the formula above with ε-caprolactone, examples being reaction products of trimethylolpropane with ε-caprolactone, reaction products of glycerol with ε-caprolactone, and reaction products of pentaerythritol with ε-caprolactone. Additionally preferred for use as H-functional starter compounds are water, diethylene glycol, dipropylene glycol, castor oil, sorbitol, and polyether polyols, constructed from repeating polyalkylene oxide units, and polyethercarbonate polyols.

With particular preference the H-functional starter compounds are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, the polyether polyol being formed from a di- or tri-H-functional starter compound and propylene oxide or from a di- or tri-H-functional starter compound, propylene oxide, and ethylene oxide, and also di- and trifunctional polyethercarbonate polyols, the polyethercarbonate polyol being formed from a di- or tri-H-functional starter compound, carbon dioxide, and propylene oxide and/or ethylene oxide. The polyether polyols and polyethercarbonate polyols preferably have an OH functionality of 2 to 4 and a molecular weight $M_n$ in the range from 62 to 4500 g/mol, and more particularly a molecular weight $M_n$ in the range from 62 to 3000 g/mol.

The suspension media which are used in step (α) for suspending the catalyst contain no H-functional groups. Suitable suspension media are all polar-aprotic, weakly polar-aprotic and nonpolar-aprotic solvents, none of which contain any H-functional groups. As suspension medium it is also possible to use a mixture of two or more of these suspension media. The following polar-aprotic solvents are mentioned here by way of example: 4-methyl-2-oxo-1,3-dioxolane (also referred to below as cyclic propylene carbonate), 1,3-dioxolan-2-one, acetone, methyl ethyl ketone, acetonitrile, nitromethane, dimethyl sulfoxide, sulfolane, dimethylformamide, dimethylacetamide and N-methylpyrrolidone. The group of the nonpolar- and weakly polar-aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

In one alternative embodiment, suspension media used in step (α) for suspending the catalyst are one or more compounds selected from the group consisting of aliphatic lactones, aromatic lactones, lactides, cyclic carbonates having at least three optionally substituted methylene groups between the oxygen atoms of the carbonate group, aliphatic cyclic anhydrides, and aromatic cyclic anhydrides. Without being tied to a theory, suspension media of this kind are incorporated into the polymer chain in the subsequent course of the ongoing polymerization in the presence of a starter. As a result, there is no need for downstream purification steps.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered-ring lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-dione, 3,6-di(but-3-en-1-yl)-1,4-dioxane-2,5-dione (in each case inclusive of optically active forms). Particular preference is given to L-lactide.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Under the conditions of the process of the invention for the copolymerization of epoxides and $CO_2$, cyclic carbonates having fewer than three optionally substituted methylene groups between the oxygen atoms of the carbonate group are incorporated into the polymer chain not at all or only to a small extent.

However, cyclic carbonates having fewer than three optionally substituted methylene groups between the oxygen atoms of the carbonate group may be used together with other suspension media. Preferred cyclic carbonates having fewer than three optionally substituted methylene groups between the oxygen atoms of the carbonate group are ethylene carbonate, propylene carbonate, 2,3-butanediol carbonate, 2,3-pentanediol carbonate, 2-methyl-1,2-propanediol carbonate and 2,3-dimethyl-2,3-butanediol carbonate.

Cyclic anhydrides used are cyclic compounds containing an anhydride group in the ring. Preferred compounds are succinic anhydride, maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and the chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

Catalyst used for preparing the higher-functionality polyethercarbonate polyols of the invention is preferably a DMC catalyst (double metal cyanide catalyst). Further to the DMC catalyst it is also possible to use zinc glutarate or a homogeneous catalyst, such as a cobalt-salen complex. An overview of the known homogeneous catalysts for copolymerizing alkylene oxides and $CO_2$ is given for example by Chemical Communications 47(2011)141-163.

The double metal cyanide compounds present in the DMC catalysts which can be used with preference in the process of the invention are the reaction products of water-soluble metal salts and water-soluble metal cyanide salts.

Double metal cyanide (DMC) catalysts are known from the prior art for the homopolymerization of alkylene oxides (see, for example, U.S. Pat. Nos. 3,404,109, 3,829,505, 3,941,849, and U.S. Pat. No. 5,158,922). DMC catalysts, described for example in U.S. Pat. No. 5,470,813, EP-A 700 949, EP-A 743 093, EP A 761 708, WO 97/40086 A1, WO 98/16310 A1 and WO 00/47649 A1, possess a very high activity and enable the preparation of polyethercarbonate polyols at very low catalyst concentrations, it being generally no longer necessary, accordingly, to remove the catalyst from the finished product. A typical example are the high-activity DMC catalysts described in EP-A 700 949, which as well as a double metal cyanide compound (e.g., zinc hexacyanocobaltate (III)) and an organic complex ligand (e.g., tert-butanol) also contain a polyether having a number-average molecular weight of greater than 500 g/mol.

The DMC catalysts which can be used in accordance with the invention are preferably obtained by (a) reacting in the first step an aqueous solution of a metal salt with the aqueous solution of a metal cyanide salt in the presence of one or more organic complex ligands, e.g. of an ether or alcohol, (b) with removal in the second step of the solid from the suspension obtained from (a), by means of known techniques (such as centrifugation or filtration), (c) with optional washing in a third step of the isolated solid with an aqueous solution of an organic complex ligand (for example by resuspending and subsequently reisolating by filtration or centrifugation), (d) with subsequent drying of the solid obtained, optionally after pulverization, at temperatures of generally 20-120° C. and at pressures of generally 0.1 mbar to standard pressure (1013 mbar), wherein in the first step or immediately after the precipitation of the double metal cyanide compound (second step) one or more organic complex ligands, preferably in excess (based on the double metal cyanide compound), and optionally further complex-forming components are added.

For example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparation of the double metal cyanide compounds preferably have a composition according to the general formula (IV), $$M(X)_n \tag{IV}$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and n is 2 when X=halide, hydroxide, carboxylate, cyanate, thiocyanate, isocyanate, isothiocyanate or nitrate, or suitable metal salts have a composition according to the general formula (V), $$M_r(X)_3 \tag{V}$$

where

M is selected from the metal cations $Fe^{3+}$, $Al^{3+}$, $Co^{3+}$ and $Cr^{3+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate and r is 1 when X=halide, hydroxide, carboxylate, cyanate, thiocyanate, isocyanate, isothiocyanate or nitrate, or suitable metal salts have a composition according to the general formula (VI), $$M(X)_s \tag{VI}$$

where

M is selected from the metal cations $Mo^{4+}$, $V^{4+}$ and $W^{4+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and s is 4 when X=halide, hydroxide, carboxylate, cyanate, thiocyanate, isocyanate, isothiocyanate or nitrate, or suitable metal salts have a composition according to the general formula (VII), $$M(X)_t \tag{VII}$$

where

M is selected from the metal cations $Mo^{6+}$ and $W^{6+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (VIII), $$(Y)_a M'(CN)_b (A)_c \tag{VIII}$$

where

M' is selected from one or more metal cations of the group consisting of Fe(II), Fe(III), Co(II), Co(III), Cr(II), Cr(III), Mn(I), Mn(II), Ir(III), Ni(II), Rh(III), Ru(II), V(IV) and V(V), M' preferably being one or more metal cations of the group consisting of Co(II), Co(III), Fe(II), Fe(III), Cr(III), Ir(III) and Ni(II), Y is selected from one or more metal cations of the group consisting of alkali metal (i.e., $Li^+$, $Na^+$, $K^+$, $Rb^+$) and alkaline earth metal (i.e., $Be^{2+}$, $Mg^{2+}$, $Ca^{2+}$, $Sr^{2+}$, $Ba^{2+}$), A is selected from one or more anions of the group consisting of halides (i.e., fluoride, chloride, bromide, iodide), hydroxide, sulfate, carbonate, cyanate, thiocyanate, isocyanate, isothiocyanate, carboxylate, azide, oxalate or nitrate, and a, b and c are integers, where the values of a, b and c are chosen so as to give electronic neutrality of the metal cyanide salt; a is preferably 1, 2, 3 or 4; b is preferably 4, 5 or 6; c preferably has a value of 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III), and lithium hexacyanocobaltate(III).

Preferred double metal cyanide compounds included in the DMC catalysts that can be used in accordance with the invention are compounds with a composition according to the general formula (IX), $$M_x[M'_{x'}(CN)_y]_z \tag{IX}$$

in which M is defined as in formula (IV) to (VII) and

M' is defined as in formula (IIX), and x, x', y, and z are integral and are selected such that the double metal cyanide compound has electron neutrality.

Preferably, x=3, x'=1, y=6 and z=2,

M=Zn(II), Fe(II), Co(II) or Ni(II) and

M'=Co(III), Fe(III), Cr(II) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S.

Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing not only aliphatic or cycloaliphatic ether groups but also aliphatic hydroxyl groups (such as, for example, ethylene glycol mono-tert-butyl ether, diethylene glycol mono-tert-butyl ether, tripropylene glycol monomethyl ether, and 3-methyl-3-oxetanemethanol). Especially preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether, and 3-methyl-3-oxetanemethanol.

Optionally in the preparation of the DMC catalysts that can be used in accordance with the invention, use is made of one or more complex-forming components from the classes of compound of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid copolymers and maleic anhydride copolymers, hydroxyethylcellulose, and polyacetals, or the glycidyl ethers, glycosides, carboxylic esters of polyhydric alcohols, gallic acids or the salts, esters, or amides thereof, cyclodextrins, phosphorus compounds, α,β-unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds at least to a molar ratio of metal salt to metal cyanide salt of 2.25:1.00. The metal cyanide salt (e.g. potassium hexacyanocobaltate) is reacted in the presence of the organic complex ligand (e.g. tert-butanol), and a suspension is formed which comprises the double metal cyanide compound (e.g. zinc hexacyanocobaltate), water, excess metal salt, and the organic complex ligand.

This organic complex ligand may be present in the aqueous solution of the metal salt and/or of the metal cyanide salt, or it is added directly to the suspension obtained after precipitation of the double metal cyanide compound. It has proven advantageous to mix the metal salt and metal cyanide salt aqueous solutions and the organic complex ligand by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the inventive catalyst) is isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the inventive catalyst. The amount of the organic complex ligand in the aqueous wash solution is preferably between 40 and 80 wt %, based on the overall solution.

Optionally in the third step the aqueous wash solution is admixed with a further complex-forming component, preferably in a range between 0.5 and 5 wt/%, based on the overall solution.

It is moreover advantageous to wash the isolated solid more than once. Washing takes place preferably, in a first washing step (c-1), with an aqueous solution of the unsaturated alcohol (by means, for example, of resuspension and subsequent reisolation by filtering or centrifugation), in order thereby to remove for example water-soluble by-products, such as potassium chloride, from the catalyst of the invention. The amount of the unsaturated alcohol in the aqueous wash solution is more preferably between 40 and 80 wt %, based on the overall solution of the first washing step. In the further washing steps (c-2) either the first washing step is repeated once or several times, preferably from one to three times, or, preferably, a nonaqueous solution, such as a mixture or solution of unsaturated alcohol and further complex-forming component (preferably in the range between 0.5 and 5 wt %, based on the total amount of the wash solution of step (c-2)), is used as the wash solution, and the solid is washed with it one or several times, preferably from one to three times.

The isolated and optionally washed solid is then dried, optionally after pulverization, at temperatures of 20-100° C. and at pressures of 0.1 mbar to atmospheric pressure (1013 mbar).

One particularly preferred method for isolating the DMC catalysts of the invention from the suspension, by filtration, filtercake washing, and drying, is described in WO-A 01/80994, for example.

Regarding the Individual Process Steps:

Step (α):

The DMC catalyst is preferably used in an amount such that the amount of DMC catalyst in the resulting polyethercarbonate polyol is 10 to 10 000 ppm, more preferably 20 to 5000 ppm, and most preferably 50 to 500 ppm. The DMC catalyst may be added in solid form or as a suspension in a suspension medium that contains no H-functional groups, or in an H-functional starter compound. During the step (α), an inert gas (as for example nitrogen or a noble gas such as argon), an inert gas/carbon dioxide mixture, or carbon dioxide may be passed through the reactor at a temperature of 50 to 200° C., preferably from 80 to 160° C., more preferably from 125 to 135° C., and at the same time a reduced pressure (absolute) of 10 mbar to 800 mbar, preferably of 40 mbar to 200 mbar, may be set in the reactor by removal of the inert gas or carbon dioxide (using a pump, for example).

Regarding Step (β):

In one preferred embodiment, the amount of one or more alkylene oxides used for the activation in step (β) is 0.1 to 25.0 wt %, preferably 1.0 to 20.0 wt %, more preferably 5 to 16.0 wt % (based on the amount of H-functional starter compound used in step ($\alpha$)). The alkylene oxide may be metered continuously into the reactor over a prolonged period, added in one step, or added in a plurality of portions stepwise. The DMC catalyst is preferably used in an amount such that the amount of DMC catalyst in the resulting polyethercarbonate polyol is 10 to 10 000 ppm, more preferably 20 to 5000 ppm, and most preferably 20 to 500 ppm.

Regarding Step ($\gamma$)

The branching agent molecules may be added in solution in a solvent or in alkylene oxide, with their concentration being 1 to 50 wt %, preferably 5 to 20 wt %, more preferably 5 to 15 wt %. Suitable solvents are all polar-aprotic, weakly polar-aprotic, and apolar-aprotic solvents in which the branching agent molecules are soluble. The following solvents may be mentioned by way of example at this point: 4-methyl-2-oxo-1,3-dioxolane, 1,3-dioxolan-2-one, toluene, xylene, ethylbenzene, chlorobenzene, and dichlorobenzene, and also mixtures of two or more of these suspension media. The branching agent molecules may be added over any desired times or throughout the time of the addition of alkylene oxide. In one alternative embodiment, the branching agent molecules may be added as the pure substance, while the alkylene oxides are metered separately in parallel.

Regarding Steps ($\gamma$) and ($\delta$)

The alkylene oxides used in steps ($\gamma$) and ($\delta$) may be the same as or different from the alkylene oxides used in step ($\beta$). The alkylene oxides used in steps ($\gamma$) and ($\delta$) may be the same or different.

The process for preparing polyethercarbonate polyols from alkylene oxides, branching agent molecules, an H-functional starter compound, and carbon dioxide in the presence of a DMC catalyst may be carried out continuously, by a semibatch method, or batchwise.

The four steps $\alpha$, $\beta$, $\gamma$, and $\delta$ may be carried out in the same reactor or each separately in different reactors. Particularly preferred reactor types are stirred tanks, tubular reactors and loop reactors.

Where reaction steps $\alpha$, $\beta$, and $\gamma$ are carried out in different reactors, a different type of reactor can be used for each step.

Polyethercarbonate polyols can be prepared in a stirred tank, the stirred tank being cooled via the reactor jacket, via internal cooling surfaces and/or via cooling surfaces located in a pumped circuit, according to embodiment and mode of operation. Both in semibatchwise application, in which the product is not removed until after the end of the reaction, and in continuous application, in which the product is removed continuously, particular attention should be paid to the metering rate of the alkylene oxide. This rate should be set such that, in spite of the inhibiting action of the carbon dioxide, the alkylene oxides are depleted quickly enough. The concentration of free alkylene oxides in the reaction mixture during the activating step (step ($\beta$)) is preferably >0 to 100 wt %, more preferably >0 to 50 wt % s, most preferably >0 to 20 wt % (based in each case on the weight of the reaction mixture). The concentration of free alkylene oxides in the reaction mixture during the copolymerization (steps ($\gamma$) and ($\delta$)) is preferably >0 to 40 wt %, more preferably >0 to 25 wt %, most preferably >0 to 15 wt % (based in each case on the weight of the reaction mixture).

In one further possible embodiment of the invention, for the copolymerization (steps ($\gamma$) and ($\delta$)), one or more H-functional starter compounds are metered into the reactor continuously during the reaction. In the case of performance of the process in semibatchwise operation, the amount of the H-functional starter compounds which are metered continuously into the reactor during the reaction is preferably at least 20 mol % equivalents, more preferably 70 to 95 mol % equivalents (based in each case on the total amount of H-functional starter compounds). In the case of continuous performance of the process, the amount of the H-functional starter compounds which are metered continuously into the reactor during the reaction is preferably at least 80 mol % equivalents, more preferably 95 to 100 mol % equivalents (based in each case on the total amount of H-functional starter compounds).

In one preferred embodiment, the catalyst/starter mixture activated in accordance with steps ($\alpha$) and ($\beta$) is reacted further in the same reactor with alkylene oxides, branching agent molecules, and carbon dioxide.

In another preferred embodiment, the catalyst/starter mixture that is activated according to steps ($\alpha$) and ($\beta$) is reacted further in a different reaction vessel (for example a stirred tank, tubular reactor, or loop reactor) with alkylene oxides, branching agent molecules, and carbon dioxide.

In another preferred embodiment, the catalyst/starter mixture that is dried according to step ($\alpha$) is reacted in a different reaction vessel (for example a stirred tank, tubular reactor, or loop reactor) in accordance with steps ($\beta$) and ($\gamma$) with alkylene oxides, branching agent molecules, and carbon dioxide.

In the case of the reaction regime in a tubular reactor, the catalyst/starter mixture dried according to step ($\alpha$) or the catalyst/starter mixture activated according to steps ($\alpha$) and ($\beta$), and optionally further starters, and also alkylene oxides, branching agent molecules, and carbon dioxide are pumped continuously through a tube. When using a catalyst/starter mixture dried as per step $\alpha$, the activation as per step ($\beta$) takes place in the first part of the tubular reactor, and the copolymerization as per step ($\beta$) takes place in the second part of the tubular reactor. The molar ratios of the co-reactants vary according to the desired polymer. In a preferred embodiment, carbon dioxide is metered in here in its liquid or supercritical form, in order to enable optimal miscibility of the components. The carbon dioxide can be introduced in the reactor at the inlet of the reactor and/or via metering points arranged along the reactor. A portion of the alkylene oxide may be introduced at the start of the reactor. The remainder of the alkylene oxide is introduced into the reactor preferably via two or more metering points arranged along the reactor. Advantageously, mixing elements for better mixing of the co-reactants are installed, as sold, for example, by Ehrfeld Mikrotechnik BTS GmbH, or mixer-heat exchanger elements which simultaneously improve the mixing and heat removal. Alkylene oxide and/or $CO_2$ metered in through the mixing elements is preferably mixed with the reaction mixture. In an alternative embodiment, different volume elements of the reaction mixture are mixed with one another.

Loop reactors may likewise be used for preparing polyethercarbonate polyols. These generally include reactors having internal and/or external materials recycling (optionally with heat exchange surfaces arranged in the circulation system), as for example a jet loop reactor or Venturi loop reactor, which can also be operated continuously, or a tubular reactor designed in the form of a loop with suitable apparatuses for the circulation of the reaction mixture, or a loop of a plurality of series-connected tubular reactors or of a plurality of series-connected stirred tanks.

In order to achieve full conversion, the reaction apparatus in which steps ($\gamma$) and ($\delta$) are performed may be connected upstream of a further tank or a tube ("delay tube"), in which residual concentrations of free alkylene oxides present after the reaction are consumed by reaction. The pressure in this downstream reactor is preferably at the same pressure as in the reaction apparatus in which reaction steps (γ) and (δ) are performed. The pressure in the downstream reactor can, however, also be selected at a higher or lower level. In another preferred embodiment, the carbon dioxide is wholly or partly discharged after reaction step (γ) and/or (δ), and the downstream reactor is operated under atmospheric pressure or a slightly elevated pressure. The temperature in the downstream reactor may be preferably 10 to 150° C. and more preferably 20 to 100° C. At the end of the downstream reactor, the reaction mixture preferably contains less than 0.05 wt % of alkylene oxide.

Preference is given to using an excess of carbon dioxide, relative to the calculated amount of carbon dioxide incorporated in the polyethercarbonate polyol, since an excess is an advantage owing to the reactive inertia of the carbon dioxide. The amount of carbon dioxide can be specified via the total pressure under the particular reaction conditions. An advantageous total pressure (absolute) has proven to be in the range from 0.01 to 120 bar, preferably 0.1 to 110 bar, more preferably from 1 to 100 bar, for the copolymerization for preparing the higher-functionality polyethercarbonate polyols. It is possible to feed in the carbon dioxide continuously or discontinuously. This depends on the rate at which the alkylene oxides and the $CO_2$ are consumed and on whether the product is optionally to include $CO_2$-free polyether blocks or blocks with different $CO_2$ contents. The amount of the carbon dioxide (reported as pressure) can likewise vary in the course of addition of the alkylene oxides. Depending on the reaction conditions selected, it is possible for the $CO_2$ to be introduced into the reactor in the gaseous, liquid or supercritical state. $CO_2$ can also be added to the reactor in solid form and then be converted under the selected reaction conditions to the gaseous, dissolved, liquid and/or supercritical state.

In a further process variant according to the invention, the DMC catalyst may be selected from the group encompassing $M_x[M'_{x'}(CN)_y]_{z'}$, where: M=Zn(II), Fe(II), Co(II) or Ni(II), M'=Co(III), Fe(III), Cr(III) or Ir(III); and x=3, x'=1, y=6, and z=2. In the reaction of carbon dioxide, monofunctional alkylene oxides, and branching agent molecules, these catalysts have proven to be particularly robust, reliable, selective, and economical in operation. They allow high and complete conversions of the individual monomer types within the selected process regime, and so contribute to an increase in the economics of the operation. The operating conditions here advantageously entail low temperatures, and the products obtained are notable for a narrow molecular mass distribution and a low viscosity. Without being tied by the theory, this is very likely due to the conditioning of the catalyst in steps (α) and (β). In particular, for the purposes of the reaction according to the invention, a DMC catalyst comprising zinc hexacyanocobaltate(III) can also be used.

In a further refinement of the process, the temperature in step (γ) can be ≥90° C. and ≤130° C. This temperature range for the implementation of the polymerization reaction has proven particularly advantageous on account of the operational economics and the properties of the higher-functionality polyethercarbonate polyols obtainable accordingly. The yields of higher-functionality polyethercarbonate polyols that are achievable within this temperature range are high, and monomer conversion is near-complete. The higher-functionality polyethercarbonate polyols obtainable are notable for a narrow molecular mass distribution and controllable functionality. In a further embodiment of the invention, moreover, the temperature in step (γ) may be ≥95° C. and ≤115° C.

In a further process characteristic, at least one of the alkylene oxides having an epoxy functionality of ≥2 in step (γ) may conform to formula (X) below:

where X1 is a chemical bond or a divalent or polyvalent, heteroatom-containing or non-heteroatom-containing C5-C22 aliphatic, aromatic, araliphatic or cycloaliphatic radical and n is an integer ≥1.

These branching agent molecules, i.e., alkylene oxides having an epoxy functionality of ≥2, prove particularly suitable for the purposes of the selected operating regime for providing higher-functionality polyethercarbonate polyols having a controllable viscosity and an increased functionality. Without being tied by the theory, this is probably due to the incorporation of the molecules into a polyethercarbonate chain as part of the synthesis reaction, and a further incorporation of the remaining free epoxy functionalities into other polyethercarbonate chains. The effective incorporation of this particular class of substance is probably a result of the electronic and steric construction of the molecules. The branching agent molecule here may have a construction which in addition to the oxirane rings also has only aliphatic, only aromatic, or mixed aliphatic or aromatic structures. Furthermore, outside the oxirane rings, the compounds may have heteroatoms such as, for example, Si, N, P, O, S and halogens. Examples of divalent compounds of the formula 1 are 1,2,3,4-diepoxybutane, 1,2,5,6-diepoxyhexane, 1,2,4,5-diepoxyhexane, 1,2,9,10-diepoxydecane, 1,2,11,12-diepoxydodecane, 1,2-, 1,3- or 1,4-di(epoxyethyl)benzene. Examples of higher polyvalent compounds of the formula (X) are 1,3,5-tri(oxiran-2-yl)benzene and 1,3,5-tri(oxiran-2-yl)cyclohexane.

In an alternative embodiment of the process, at least one of the alkylene oxides having an epoxy functionality of ≥2 in step (γ) may conform to the formula (XI) below:

where X2 and X3 independently of one another are a chemical bond or heteroatom-containing or non-heteroatom-containing C5-C22 araliphatic or aliphatic or cycloaliphatic radicals.

Examples of compounds of the formula (XI) are cyclopentadiene dioxide, cyclohexadiene dioxide, cyclooctadiene dioxide, (3,4-epoxycyclohexane)methyl 3,4-epoxycyclohexylcarboxylate, or dicyclopentadiene dioxide. For the purposes of the selected operating regime, these branching agent molecules prove particularly suitable for providing higher-functionality polyethercarbonate polyols having a controllable viscosity and an increased functionality. Without being tied by the theory, this is probably due to the incorporation of the molecules into a polyethercarbonate chain as part of the synthesis reaction, and a further incorporation of the remaining free epoxy functionalities into other polyethercarbonate chains. The effective incorporation of this particular class of substance is probably a result of the electronic and steric construction of the molecules and particularly good interaction with the catalyst used. This good interaction may very likely be due in particular to the rigid framework of the branching agent molecule. The branching agent molecule here may have a construction which in addition to the oxirane rings also has only aliphatic, only aromatic, or mixed aliphatic or aromatic structures. Furthermore, outside the oxirane rings, the compounds may have heteroatoms such as, for example, Si, N, P, O, S and halogens.

In an additional refinement of the process, at least one of the alkylene oxides having an epoxy functionality of ≥2 in step (γ) may conform to the formula (XII) below:

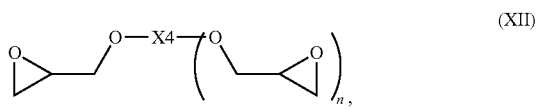

(XII)

where X4 is a di- or polyvalent, heteroatom-containing or non-heteroatom-containing C5-C22 aliphatic, aromatic, araliphatic or cycloaliphatic radical and n is an integer ≥1.

Examples of compounds of the formula (XII) are the diglycidyl ethers of the following diols: ethylene glycol, 1,2- and 1,3-propylene glycol, 1,4-butanediol, diethylene glycol, dipropylene glycol, polyethylene glycol, polypropylene glycol, cyclohexanedimethanol, TCD diol, neopentyl glycol, bisphenol A, bisphenol F, 1,2-dihydroxybenzene, resorcinol, 1,4-dihydroxybenzene, bishydroxyethyl-bisphenol A or ring-hydrogenated bisphenol A.

Examples of divalent compounds of the formula (XII) are bisphenol A diglycidyl ether, 1,2-bis(oxiran-2-ylmethoxy) benzene, 1,3-bis(oxiran-2-ylmethoxy)benzene, and 1,4-bis (oxiran-2-ylmethoxy)benzene. Examples of multivalent compounds of the formula (XII) are multiple glycidyl ethers of multiple alcohols, such as, for example, 1,3,5-tris(oxiran-2-ylmethoxy)benzene, phosphoric acid triglycidyl ether. The compounds of the formula (XII) may have ether groups and hydroxyl groups in the radicals X4. Furthermore, there may be mixtures of different compounds of the formulae (X), (XI) and (XII) used, preferably of different compounds of the formula (XII). For the purposes of the selected operating regime, these branching agent molecules prove particularly suitable for providing higher-functionality polyethercarbonate polyols having a controllable viscosity and an increased functionality. Without being tied by the theory, this is probably due to the incorporation of the molecules into a polyethercarbonate chain as part of the synthesis reaction, and a further incorporation of the remaining free epoxy functionalities into other polyethercarbonate chains. The effective incorporation of this class of substance is probably a result of the electronic and steric construction of the molecules and particularly good interaction with the catalyst used. This good interaction may very likely be brought about by the flexibility of the middle part of the branching agent molecule, and this may allow effective contacting of further polymers. The branching agent molecule here may have a construction which in addition to the oxirane rings also has only aliphatic, only aromatic, or mixed aliphatic or aromatic structures. Besides the oxygen, the compounds outside the oxirane rings may additionally have heteroatoms such as S, N, Si, P, for example.

In a further embodiment of the process, at least one of the alkylene oxides having an epoxy functionality of ≥2 may conform to the following dialkylene oxides: vinylcyclohexene dioxide, limonene dioxide or isoprene dioxide.

Furthermore, in an additional aspect of the process of the invention, the addition of the alkylene oxide or oxides having an epoxy functionality of ≥2 in step (γ) may be concluded before 50 mol % of the total amount of alkylene oxides have been added. Without being tied by the theory, different molecular geometries of the higher-functionality polyethercarbonate polyol may result as a function of the timing of addition of the branching agent molecules. One possibility for the influence of the timing of addition on the obtainable molecular geometry is illustrated in scheme (XIII) (here by way of example: addition of one equivalent of divalent branching agent molecules per equivalent of bifunctional starter):

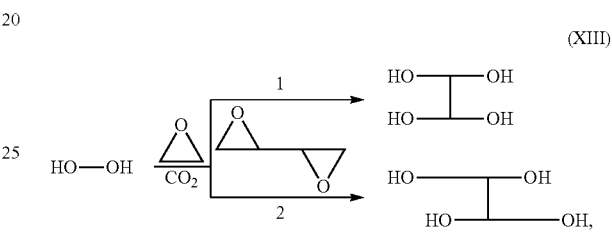

(XIII)

Reaction Regime 1: The "Early Addition":

The addition is preferably concluded before more than half, preferably before more than a quarter, of the alkylene oxides have been added ("early addition"). This procedure results in more of an H-shaped molecular geometry with exposed functional groups, OH groups for example, in the outer regions of the polymer structure. As a consequence, this leads to particularly low viscosity in the resulting polyethercarbonate polyols and to lower gel points on subsequent reaction with crosslinking reagents, such as isocyanates, for example.

Reaction Regime 2: The "Late Addition":

The branching agent molecules can also be added after more than half, optionally after more than three quarters, of the alkylene oxides have been added ("late addition"). Within this embodiment, the molecular geometries obtained are more Z-shaped, with increased viscosity and with at least partial steric shielding of individual H-functional groups. In the context of a subsequent reaction with crosslinking reagents, such as isocyanates, for example, this may result in later gel points.

In an alternative embodiment, the addition of the branching agent molecules may take place during any desired times or during the entire time of the addition of alkylene oxide. On addition of several equivalents of branching agent molecules, based on the amount of a bifunctional starter used, and on continuous addition of the branching agent molecules over a relatively long time period of the alkylene oxide addition, ladder-shaped molecules may be obtained.

Accordingly, in one embodiment of the process of the invention for the preparation of relatively high-functionality polyethercarbonate polyols from one or more alkylene oxides, one or more branching agent molecules, one or more H-functional starter compounds, and carbon dioxide, in the presence of a double metal cyanide catalyst, the process regime selected can be as follows:

(α) Under inert gas atmosphere (for example, argon or nitrogen), under an atmosphere of an inert gas/carbon dioxide mixture, or under a pure carbon dioxide atmosphere, at temperatures of 90 to 150° C., preferably of 125 to 135° C., the DMC catalyst is introduced and then the H-functional starter compound is added, (β) to the mixture from step (α) under inert gas or an inert gas/carbon dioxide mixture (for example, argon/carbon dioxide mixture or nitrogen/carbon dioxide mixture) or under a pure carbon dioxide atmosphere, alkylene oxide is added at temperatures of 90 to 150° C., preferably of 125 to 135° C., and subsequently (γ) branching agent molecules, optionally in solution in a solvent or in one or more alkylene oxides, and carbon dioxide are metered continuously into the mixture resulting from step (β) ("addition of branching agent molecules"), (δ) one or more alkylene oxides and carbon dioxide are metered continually into the mixture resulting from step (γ) ("copolymerization").

Steps (γ) and (δ) can be carried out in this order ("early addition") and in the opposite order ("late addition"). The addition of the branching agent molecules after the activation phase and at the beginning of the actual polymerization ("early addition") is preferred. Steps (γ) and (δ) may also be carried out multiply in any order.

The breadth of the molar mass distribution (polydispersity) of the higher-functionality polyethercarbonate polyols obtainable in accordance with the invention may be lower on early addition of the branching agent molecules than in the case of a later addition. For instance, on early addition, the polydispersity may be below 4.0, and on late addition it may be below 6.0. Preferred higher-functionality polyethercarbonate polyols are those having a polydispersity of below 2.5.

The viscosity of the higher-functionality polyethercarbonate polyols of the invention may be lower on early addition of the branching agent molecules than in the event of a later addition. For example, the viscosity of a copolymer of propylene oxide and $CO_2$, obtained using bisphenol A diglycidyl ether ("BADGE") or 1,2,9,10-diepoxydecane ("DED") as branching agent molecule, may on early addition be between ≥1000 and ≤6000 mPa·s.

Within a further embodiment of the process of the invention, steps (γ) and (δ) may take place in opposite order. This process regime may be advantageous in particular if the desire is for higher-functionality polyethercarbonate polyols that are of relatively high viscosity and have a broad molar mass distribution, i.e., high polydispersity. Furthermore, this process may advantageously be employed if relatively long curing times are desired within further reactions. These relatively long curing times may be occasioned, for example, by the molecular geometry, as a result of increased shielding of the functional groups at the ends of the polymers.

In a further embodiment of the process of the invention, at least the step (δ) is carried out continuously.

In a further embodiment of the process of the invention, step (δ) comprises the continuous metering of an H-functional starter compound. The amount of the further H-functional starter compounds which are metered continuously into the reactor in step (δ) is preferably at least 20 mol % equivalents, more preferably at least 70 mol % equivalents, and very preferably at least 95 mol % equivalents (based in each case on the total amount of H-functional starter compounds). Furthermore, carbon dioxide and epoxide are supplied continuously to the reactor. Withdrawn continuously from the reactor is a portion of the product mixture, and so the amount of product mixture present in the reactor remains constant within certain limits.

In a further embodiment of the process of the invention, step (δ) comprises the discontinuous metering of an H-functional starter compound. The discontinuous metering of an H-functional starter compound may comprise the addition of the H-functional starter compound in one or more pulses or with constant or changing rate of addition over part of the time, while one or more alkylene oxides and carbon dioxide are being metered continuously in step (δ) into the mixture resulting from step (γ). The amount of the further H-functional starter compounds which are metered continuously into the reactor in step (δ) is preferably at least 20 mol % equivalents, more preferably at least 70 mol % equivalents, and very preferably at least 95 mol % equivalents (based in each case on the total amount of H-functional starter compounds). Furthermore, over the reaction time needed to produce the desired molecular weight, the reactor is supplied continuously with carbon dioxide and epoxide.

In one specific embodiment of the process of the invention for preparing relatively high-functionality polyethercarbonate polyols from one or more alkylene oxides, one or more branching agent molecules, one or more H-functional starter compounds, and carbon dioxide, in the presence of a double metal cyanide catalyst, the process regime selected may be as follows:

(α) Under inert gas atmosphere (for example, argon or nitrogen), under an atmosphere of an inert gas/carbon dioxide mixture, or under a pure carbon dioxide atmosphere, at temperatures of 90 to 150° C., preferably of 125 to 135° C., the DMC catalyst is introduced and then the suspension medium containing no H-functional groups or the H-functional starter compound is added, (β) to the mixture from step (α) under inert gas or an inert gas/carbon dioxide mixture (for example, argon/carbon dioxide mixture or nitrogen/carbon dioxide mixture) or under a pure carbon dioxide atmosphere, alkylene oxide is added at temperatures of 90 to 150° C., preferably of 125 to 135° C., and subsequently (δ1) the H-functional starter compound, a portion of the one or more alkylene oxides, and carbon dioxide are metered continuously into the mixture resulting from step (β) ("copolymerization"), (γ) branching agent molecules, optionally in solution in a solvent or in one or more alkylene oxides, and carbon dioxide are metered continuously into the mixture resulting from step (δ1) ("addition of branching agent molecules"), (δ2) one or more alkylene oxides and carbon dioxide are metered continually into the mixture resulting from step (γ) ("copolymerization").

The ratio of the amount of alkylene oxide in steps (δ1) and (δ2) in this embodiment defines the architecture of the resulting higher-functionality polyethercarbonate polyols. The amount of alkylene oxide in step (δ1) may be small in relation to the amount of alkylene oxide in step (δ2) ("early addition"). Alternatively the amount of alkylene oxide in step (δ1) may be large in relation to the amount of alkylene oxide in step (δ2) ("late addition"). Preferably the amount of alkylene oxide in step (δ1) is small in relation to the amount of alkylene oxide in step (δ2) ("early addition"). For example, the ratio of the amount of alkylene oxide in step (δ1) to the amount of alkylene oxide in step (δ2) may be smaller than 0.5, preferably smaller than 0.2. The steps (δ1), (γ) and (δ2) may also be carried out multiply in any order.

In another specific embodiment of the process of the invention for preparing relatively high-functionality polyethercarbonate polyols from one or more alkylene oxides, one or more branching agent molecules, one or more H-functional starter compounds, and carbon dioxide, in the presence of a double metal cyanide catalyst, the process regime selected may be as follows:

(α) Under inert gas atmosphere (for example, argon or nitrogen), under an atmosphere of an inert gas/carbon dioxide mixture, or under a pure carbon dioxide atmosphere, at temperatures of 90 to 150° C., preferably of 125 to 135° C., the DMC catalyst is introduced and then the suspension medium containing no H-functional groups is added, (β) to the mixture from step (α) under inert gas or an inert gas/carbon dioxide mixture (for example, argon/carbon dioxide mixture or nitrogen/carbon dioxide mixture) or under a pure carbon dioxide atmosphere, alkylene oxide is added at temperatures of 90 to 150° C., preferably of 125 to 135° C., and subsequently (γ) branching agent molecules, optionally in solution in a solvent or in one or more alkylene oxides, are metered continuously into the mixture resulting from step (3) ("addition of branching agent molecules"), (δ) the H-functional starter compound, one or more alkylene oxides and carbon dioxide are metered continually into the mixture resulting from step (β) ("copolymerization").

The addition of the compounds in steps (γ) and (δ) may be commenced in any order. Preferably the addition of the H-functional starter compound, one or more alkylene oxides, and carbon dioxide in step (δ) is commenced before the addition of the branching agent molecules in step (γ) is commenced. The continual metering of the branching agent molecules in step (γ) and of the H-functional starter compound, one or more alkylene oxides, and carbon dioxide in step (δ) takes place preferably parallel to (simultaneously with) one another in a continuous process regime. Alternatively, steps (γ) and (δ) may be carried out alternatingly or each inherently with repeated pulsed addition of the components. In parallel with the continual addition of the compounds in steps (γ) and (δ), a portion of the product mixture is removed continuously from the reactor in a continuous process regime. Optionally there is a further reactor downstream of the reactor, said further reactor being the venue for reaction of the resultant higher-functionality polyethercarbonate polyol with further alkylene oxide, containing in each case one epoxide group per molecule, and with carbon dioxide ("early addition" of the branching agent molecule). Step (δ) may alternatively be carried out in a first reactor as well, and step (γ) in a second reactor ("late addition").

Further in the sense of the invention is a process where in an additional process step the higher-functionality polyethercarbonate polyol is reacted with di- and/or polyisocyanates. In comparison to linear polyethercarbonate polyols, the higher-functionality polyethercarbonate polyols of the invention have a lower viscosity for a given OH number, thereby improving the technical handling qualities in the context of this type of crosslinking reactions. Furthermore, the higher-functionality polyethercarbonate polyols of the invention are notable for high reactivity toward crosslinking reagents, such as isocyanates, as manifested in shorter times to reach the gel point. The additional process step may take place either directly following the synthesis of the higher-functionality polyethercarbonate polyols in the same reaction vessel or in a downstream reaction vessel. Furthermore, this step may also not be carried out until later, following purification and/or storage of the higher-functionality polyethercarbonate polyols, in further vessels or, for example, directly on the surface of workpieces to be coated.

Further in accordance with the invention is a higher-functionality polyethercarbonate polyol obtainable by the process of the invention. The higher-functionality polyethercarbonate polyols obtainable by the process of the invention are notable for controllable viscosity, low residual monomer content, and reproducible, high functionalities. The higher-functionality polyethercarbonate polyols can be used as starters for further polymerization steps, such as a subsequent reaction with alkylene oxides or with alkylene oxides and carbon dioxide, for example.

Furthermore, the process of the invention allows the preparation of higher-functionality polyethercarbonate polyols in a single operating step, with the functionality of the branched polymer chains always being greater than the functionality of the starter compound used. The preparation of these higher-functionality polyethercarbonate polyols necessitates only small amounts of the branching agent molecules, relative to the amount of alkylene oxides and/or starter compounds used.

In one particular embodiment, the average number of branching sites in the higher-functionality polyethercarbonate polyol may be $\geq 1$ and $\leq 10$, preferably $\geq 1$ and $\leq 5$. The average number of the branching sites per polyethercarbonate polyol molecules ($N_{BS}$) is a product of the molar ratio of the branching agent molecules used to starter molecules. The ratio of branching agent molecules to starter molecules in the higher-functionality polyethercarbonate polyol may be determined, for example, via NMR spectroscopy and analysis of the intensities of the characteristic signals for branching agent molecules and starter molecules. The average number of branching sites in the

| Functionality of starter molecule | Functionality of branching agent molecule | Branching agent molecules/starter molecules molar ratio | $N_{BS}$ | F |
|---|---|---|---|---|
| 2 | 2 | 1/2 | 1 | 4 |
| 2 | 2 | 2/3 | 2 | 6 |
| 2 | 2 | 3/4 | 3 | 8 |
| 2 | 3 | 1/3 | 1 | 6 |
| 2 | 3 | 2/5 | 2 | 10 |
| 3 | 2 | 1/2 | 1 | 6 |
| 3 | 2 | 2/3 | 2 | 9 |
| 3 | 3 | 1/3 | 1 | 9 |

$N_{BS}$ average number of branching sites per polyol molecules;
F average functionality of the polyethercarbonate polyol molecules This amount of branching agent molecules has proven particularly suitable for the acquisition of a relatively high functionality in the polyethercarbonate polyol molecules in conjunction with a medium to low viscosity of the polyethercarbonate polyols. The low viscosity of the higher-functionality polyethercarbonate polyols obtainable by the process of the invention also secures good possibilities for further processing of the polymers, with, for example, rapid conversions in the context of further crosslinking reactions.

In principle it is possible, moreover, to control the amount of branching agent molecules as a function of the desired polymer functionality. This can be selected such that the arithmetically determined average functionality F of the resultant higher-functionality polyethercarbonate polyol is at least 2, preferably $2<F\leq 22$, more preferably $2<F\leq 12$, and very preferably $2<F\leq 8$. This corresponds to an incorporation of on average 0-11 mol of branching agent molecules per mole of macromolecule, preferably of 0-6 mol of branching agent molecules per mole of macromolecule, and more preferably of 0-4 mol of branching agent molecules per mole of macromolecule. These stated ranges for the average functionality may contribute to rapid conversions in the case of polymerization reactions and, accordingly, to preferred mechanical properties in the coats or moldings obtainable accordingly.

In particular, via the average number of branching sites, it is possible to control the molecular weight of the higher-functionality polyethercarbonate polyols. The molecular weight may advantageously be at least 400 g/mol, preferably 400 to 1 000 000 g/mol, and very preferably 500 to 60 000 g/mol. Together with the controllable molecular geometry, these molecular weight ranges may lead to suitable viscosities of the higher-functionality polyethercarbonate polyols.

The higher-functionality polyethercarbonate polyols preparable in accordance with the invention may be used in laundry detergent and cleaning product formulations, drilling fluids, fuel additives, ionic and nonionic surfactants, lubricants, process chemicals for papermaking or textiles production, cosmetic formulations, or as pore formers in the production of ceramics. By virtue of the flexibility of the process of the invention, higher-functionality polyethercarbonate polyols with controllable functionalities, molecular weight distributions, and viscosities can be obtained in a targeted way, and can be used advantageously in areas of application identified above. The skilled person is aware that depending on the particular field of application, the polyethercarbonate polyols for use are required to meet certain materials properties, such as molecular weight, viscosity, functionality and/or hydroxyl number, for example.

Particularly within the sense of the invention, moreover, is a crosslinked polyethercarbonate polymer obtainable by the process of the invention from the higher-functionality polyethercarbonate polyols. The isocyanate-crosslinked polyethercarbonate polymers obtainable by this process may be distinguished by a simple operating regime in their preparation and by improved mechanical properties. This is likely due to the functionality per crosslinkable polyethercarbonate polyol molecule, this functionality being higher in comparison to unbranched polyethercarbonate polymers. The controllable viscosity of the higher-functionality polyethercarbonate polyols may be utilized, moreover, for providing higher-functionality polyethercarbonate polyols of extremely low viscosity, which may lead to particularly fast-curing and homogeneous products.

The crosslinked polyethercarbonate polymers may be used, furthermore, in thermoset solids, viscoelastic foams, or coatings. The higher-functionality polyethercarbonate polyols obtainable by the process of the invention may be processed without problems, in particular by reaction with di- and/or polyisocyanates, to form polyurethanes, more particularly to form flexible polyurethane foams, rigid polyurethane foams, polyurethane elastomers or polyurethane coatings. For polyurethane applications, it is possible with preference to use higher-functionality polyethercarbonate polyols which possess a functionality of at least 2, preferably at least 2.5 and more preferably at least 2.8. As a function of the glass transition temperature and of the service temperature of the crosslinked polyethercarbonate polymers, moldings or coats with elastomeric or thermoset character may be produced in this way.

Also in the sense of the invention are moldings featuring a layer comprising a crosslinked polyethercarbonate polymer. The layers which can be produced in accordance with the invention may contribute to mechanical and chemical protection on moldings and may contribute accordingly to an increased useful life of workpieces. By virtue of the high functionality and controllable viscosity, these layers on moldings can be produced rapidly and uniformly.

For further advantages and features of the use described above, reference is hereby made explicitly to the elucidations in connection with the polymers of the invention and also the process of the invention. In addition, features and advantages of the process that are in accordance with the invention are also to be applicable to and disclosed for the polymers of the invention and the use according to the invention, and vice versa. The invention also encompasses all combinations of at least two features disclosed in the description and/or in the claims.

EXAMPLES

Substances

H-functional starter compound (starter) used:
PET-1 difunctional poly(oxypropylene) polyol having an OH number of 112 mg KOH/g
Monofunctional alkylene oxide used:
PO propylene oxide
Alkylene oxides used, having an epoxy functionality of ≥2:
BAGE bisphenol A diglycidyl ether
DED 1,2,9,10-diepoxydecane
The DMC catalyst was prepared according to example 6 of WO-A 01/80994.
Preparation of the Higher-Functionality Polyethercarbonate Polyols:

The polymerization reactions were conducted in a 300 ml Parr pressure reactor. The pressure reactor used in the examples had a height (internal) of 10.16 cm and an internal diameter of 6.35 cm. The reactor was equipped with an electrical heating jacket (510 watts' maximum heating power). The counter-cooling consisted of an immersed tube of external diameter 6 mm which had been bent into a U shape, and which projected into the reactor to 5 mm above the base, and through which cooling water flowed at about 10° C. The water flow was switched on and off by means of a magnetic valve. In addition, the reactor was equipped with an inlet tube and a thermal sensor of diameter 1.6 mm, which both projected into the reactor up to 3 mm above the base.

The heating power of the electrical heating jacket during the activation [first activation stage] averaged about 20% of the maximum heating power. As a result of the regulation, the heating power varied by ±5% of the maximum heating power. The occurrence of increased evolution of heat in the reactor, brought about by the rapid reaction of propylene oxide during the activation of the catalyst [second activation stage], was observed via reduced heating power of the heating jacket, engagement of the counter-cooling, and, optionally, a temperature increase in the reactor. The occurrence of evolution of heat in the reactor, brought about by the continuous reaction of propylene oxide during the reaction [polymerization stage], led to a fall in the power of the heating jacket to about 8% of the maximum heating power. As a result of the regulation, the heating power varied by ±5% of the maximum heating power.

The hollow-shaft stirrer used in the examples was a hollow-shaft stirrer in which the gas was introduced into the reaction mixture via a hollow shaft in the stirrer. The stirrer body mounted on the hollow shaft had four arms, a diameter of 35 mm, and a height of 14 mm. Mounted at each end of the arm were two gas outlets which had a diameter of 3 mm. The rotation of the stirrer gave rise to a reduced pressure such that the gas present above the reaction mixture ($CO_2$ and possibly alkylene oxide) was drawn off and introduced through the hollow shaft of the stirrer into the reaction mixture.

For the removal of the low molecular mass constituents, the reaction mixture was diluted with dichloromethane (20 ml) and the solution was passed through a falling-film evaporator. The solution (0.1 kg in 3 h) ran downward along the inner wall of a tube of diameter 70 mm and length 200 mm which had been heated externally to 120° C., in the course of which the reaction mixture was distributed homogeneously as a thin film on the inner wall of the falling-film evaporator in each case by three rollers of diameter 10 mm rotating at a speed of 250 rpm. Within the tube, a pump was used to set a pressure of 3 mbar. The product mixture, purified to free it of volatile constituents (unreacted alkylene oxides, cyclic carbonate, solvent), was collected in a receiver at the lower end of the heated tube.

Characterization of the Higher-Functionality Polyethercarbonate Polyols:

The copolymerization of propylene oxide and $CO_2$ results not only in the cyclic propylene carbonate but also in the polyethercarbonate polyol which in addition to the branches has on the one hand polycarbonate units shown in formula (XIV),

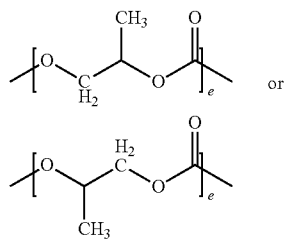

(XIV)

and on the other hand polyether units shown in formula (XV).

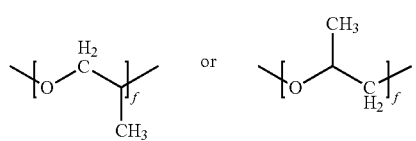

(XV)

The characterization of the reaction mixture by determination of the amount of unreacted propylene oxide ($R_{PO}$), unreacted branching agent molecules ($R_{BADGE}$, $R_{DED}$), and cyclic carbonate (ratio g/e) took place by $^1$H-NMR spectroscopy in accordance with the method described below.

The low molecular mass compounds in the reaction mixture were subsequently removed in a falling-film evaporator in accordance with the method described above, and the resulting product mixture was analyzed for determination of the $CO_2$ content of the polymer (ratio e/f, $A_{carbonate}$) and also, when using BADGE or DED as branching agent molecule, for the amount of branching agent molecules in the polymer ($A_{BADGE}$, $A_{DED}$) by means of $^1$H-NMR spectroscopy in accordance with the method described below. The product mixture was further characterized by gel permeation chromatography and determination of the OH number, the viscosity, and the gel point, in accordance with the methods described below.

Methods:
$^1$H-NMR Spectroscopy

A sample of the reaction mixture or product mixture was dissolved in deuterated chloroform and measured on a Bruker spectrometer (AV400, 400 MHz). The relevant resonances in the $^1$H-NMR spectrum (relative to TMS=0 ppm) are as follows:

| Signal | Shift in ppm | Designation | Area corresponds to number of H atoms |
|---|---|---|---|
| I1 | 1.11-1.17 | $CH_3$ group of the polyether units | 3 |
| I2 | 1.25-1.32 | $CH_3$ group of the polycarbonate units | 3 |
| I3 | 1.45-1.49 | $CH_3$ group of the cyclic carbonate | 3 |
| I4 | 1.86-1.95 | $CH_3$ group of the bisphenol A diglycidyl ether incorporated into the polymer | 6 |
| I5 | 2.95-2.99 | CH group of the free, unreacted propylene oxide | 1 |
| I6 | 3.04-3.09 | CH group of the free, unreacted bisphenol A diglycidyl ether | 1 |
| I7 | 2.33-2.57 | CH group of the free, unreacted 1,2,9,10-diepoxydecane | 1 |

Taking account of the relative intensities, the values were calculated as follows:

The molar fraction of the unreacted propylene oxide ($R_{PO}$ in mol %), based on the sum of the amount of propylene oxide used in the activation and in the copolymerization:

$$R_{PO}=[(I5)/((I1/3)+(I2/3)+(I3/3)+(I4/6)+(I5)+(I6))]\times 100\% \quad (XX)$$

The molar fraction of the unreacted bisphenol A diglycidyl ether ($R_{BADGE}$ in mol %), based on the sum of the amount of bisphenol A diglycidyl ether used in the activation and in the copolymerization:

$$R_{BADGE}=[(I6)/((I1/3)+(I2/3)+(I3/3)+(I4/6)+(I5)+(I6))]\times 100\% \quad (XXI)$$

The molar fraction of the unreacted 1,2,9,10-diepoxydecane ($R_{DED}$ in mol %), based on the sum of the amount of 1,2,9,10-diepoxydecane used in the activation and in the copolymerization:

$$R_{DED}=[(I7)/((I1/3)+(I2/3)+(I3/3)+(I5)+(I7))]\times 100\% \quad (XXI)$$

Molar ratio of the amount of cyclic propylene carbonate to polymer (selectivity, g/e):

$$g/e=I3/I2 \quad (XVI)$$

Molar ratio of carbonate groups to ether groups in the polymer (e/f):

$$e/f=I2/I1 \quad (XVII)$$

The fraction of carbonate units ($A_{carbonate}$ in mol %) in the repeating units of the polyethercarbonate polyol:

$$A_{carbonate}=[(I2/3)/((I1/3)+(I2/3)+(I4/6))]\times 100\% \quad (XVIII)$$

The molar fraction of reacted bisphenol A diglycidyl ether ($A_{BADGE}$ in mol %) in the repeating units of the polyethercarbonate polyol:

$$A_{BADGE}=[(I4/3)/((I1/3)+(I2/3)+(I4/6))]\times 100\% \quad (XIX)$$

Gel Permeation Chromatography

The number-average $M_n$ and the weight-average $M_w$ molecular weights of the resultant polyethercarbonate polyols were determined by means of gel permeation chromatography (GPC). The procedure was that of DIN 55672-1: "Gel permeation chromatography, Part 1-Tetrahydrofuran as eluent" (SECurity GPC system from PSS Polymer Service, flow rate 1.0 ml/min; columns: 2×PSS SDV linear M, 8×300 mm, 5 µm; RID detector). Polystyrene samples of known molar mass were used for calibration. The polydispersity was calculated as the ratio $M_w/M_n$.

OH Number (Hydroxyl Number)

The OH number (hydroxyl number) was determined on the basis of DIN 53240-2, except using N-methylpyrrolidone rather than THF/dichloromethane as the solvent. Titration took place with 0.5 molar ethanolic KOH solution, with endpoint recognition by means of potentiometry. The test substance used was certified castor oil. The reporting of the unit in "$mg_{KOH}/g$" refers to mg[KOH]/g[polyetherestercarbonate polyol].

Rheology

The viscosity of the product mixture was determined using a Physica MCR 501 rheometer from Anton Paar at 25° C., using a sphere/plate configuration with a sphere diameter of 25 mm and with a distance of 0.05 mm between sphere and plate. The shear rate was increased over 10 minutes from 0.01 to 1000 1/s. A value was taken every 10 seconds. The result reported is the viscosity as the average of the total of 60 measurement values.

For the rheological determination of the gel point, the polyethercarbonate polyols were admixed with an equimolar amount of aliphatic polyisocyanates (HDI trimer, Desmodur N3300) and 2000 ppm of dibutyltin laurate (2% in diphenyl ether). The complex moduli G' (storage modulus) and G" (loss modulus) were determined in an oscillation measurement at 40° C. and a frequency of 1 Hz, using a plate/plate configuration with a plate diameter of 15 mm, a plate-to-plate distance of 1 mm, and a 10 percent deformation. The gel point was defined as the point in time at which storage modulus and loss modulus were of equal magnitude.

Example 1

Higher-Functionality Polyethercarbonate Polyol Having an Arithmetic Functionality of 2.7, Obtained by "Early Addition" of BADGE

[Step (α)]

A 300 ml pressure reactor equipped with gas introduction stirrer was charged with a mixture of DMC catalyst (13.6 mg) and PET-1 (17.4 g) and stirred for 30 minutes at 130° C. under a gentle vacuum (50 mbar) and gentle Ar stream (800 rpm).

[Step (β)]

15 bar of $CO_2$ were injected, causing the temperature in the reactor to drop slightly. The temperature was readjusted to 130° C., and during the subsequent steps the pressure in the reactor was held at 15 bar by further additions of $CO_2$. 1.74 g of propylene oxide were metered in using an HPLC pump (1 ml/min) and the reaction mixture was stirred (800 rpm) for 20 minutes. The appearance of a briefly increased evolution of heat in the reactor during this time indicated the activation of the catalyst. Subsequently a further 1.74 g of propylene oxide were metered in by means of the HPLC pump (1 ml/min) and the reaction mixture was stirred for 20 minutes (800 rpm). The occurrence of a briefly increased evolution of heat in the reactor during this time confirmed the activation of the catalyst.

[Step (γ)]

After cooling to 100° C. had taken place, a mixture of 3.42 g (10.05 mmol) of bisphenol A diglycidyl ether in solution in 7.97 g of propylene oxide was metered in with stirring by an HPLC pump (1 ml/min), the reaction mixture being stirred further (800 rpm).

[Step (δ)]

Immediately thereafter, with further stirring (800 rpm), a further 34.0 g of propylene oxide were metered in via an HPLC pump (1 ml/min). After the end of the addition of propylene oxide, the reaction mixture was stirred for a further 2 hours at 100° C. The reaction was ended by cooling of the reactor in an ice bath, and the elevated pressure was let down and the resulting product was analyzed.

Analysis of the reaction mixture by NMR spectroscopy showed complete conversion of the propylene oxide ($R_{PO}$=0%) and of the BADGE ($R_{BADGE}$=0%).

| Selectivity | g/e | 0.14 |
|---|---|---|
| | e/f ($A_{carbonate}$) | 0.17 |
| | | (17.8% carbonate units in the PEC) |
| $A_{BADGE}$ in % | | 0.93 |
| Molecular weight | $M_n$ | 2316 |
| in g/mol | $M_w$ | 2617 |
| Polydispersity | | 1.13 |
| OH number in $mg_{KOH}/g$ | | 69.4 |
| Viscosity in mPa · s | | 1065 |
| Gel point in min | | 7.6 |

Example 2

Higher-Functionality Polyethercarbonate Polyol Having an Arithmetic Functionality of 2.7, Obtained by "Late Addition" of BADGE

[Step (α)]

A 300 ml pressure reactor equipped with gas introduction stirrer was charged with a mixture of DMC catalyst (13.6 mg) and PET-1 (17.4 g) and stirred for 30 minutes at 130° C. under a gentle vacuum (50 mbar) and gentle Ar stream (800 rpm).

[Step (β)]

15 bar of $CO_2$ were injected, causing the temperature in the reactor to drop slightly. The temperature was readjusted to 130° C., and during the subsequent steps the pressure in the reactor was held at 15 bar by further additions of $CO_2$. 1.74 g of propylene oxide were metered in using an HPLC pump (1 ml/min) and the reaction mixture was stirred (800 rpm) for 20 minutes. The appearance of a briefly increased evolution of heat in the reactor during this time indicated the activation of the catalyst. Subsequently a further 1.74 g of propylene oxide were metered in by means of the HPLC pump (1 ml/min) and the reaction mixture was stirred for 20 minutes (800 rpm). The occurrence of a briefly increased evolution of heat in the reactor during this time confirmed the activation of the catalyst.

[Step (δ)]

After cooling to 100° C. had taken place, a further 34.0 g of propylene oxide were metered in by an HPLC pump (1 ml/min) with further stirring (800 rpm).

[Step (γ)]

Immediately thereafter, with stirring, a mixture of 3.42 g (10.1 mmol) of bisphenol A diglycidyl ether in solution in 7.97 g of propylene oxide was metered in by an HPLC pump (1 ml/min), the reaction mixture being stirred further (800 rpm). After the end of the addition of propylene oxide, the reaction mixture was stirred for a further 2 hours at 100° C. The reaction was ended by cooling of the reactor in an ice bath, and the elevated pressure was let down and the resulting product was analyzed.

Analysis of the reaction mixture by NMR spectroscopy showed complete conversion of the propylene oxide ($R_{PO}$=0%) and the BADGE ($R_{BADGE}$=0%).

| Selectivity | g/e | 0.22 |
|---|---|---|
| | e/f ($A_{carbonate}$) | 0.17 |
| | | (14.3% carbonate units in the PEC) |
| $A_{BADGE}$ in % | | 0.93 |
| Molecular weight | $M_n$ | 3011 |
| in g/mol | $M_w$ | 4576 |
| Polydispersity | | 1.52 |
| OH number in $mg_{KOH}$/g | | 69.3 |
| Viscosity in mPa · s | | 1269 |
| Gel point in min | | 8.4 |

Comparative Example 3

Unbranched, Linear Polyethercarbonate Polyol Having a Functionality of 2.0

[Step (α)]

A 300 ml pressure reactor equipped with gas introduction stirrer was charged with a mixture of DMC catalyst (13.6 mg) and PET-1 (17.4 g) and stirred for 30 minutes at 130° C. under a gentle vacuum (50 mbar) and gentle Ar stream (800 rpm).

[Step (β)]

15 bar of $CO_2$ were injected, causing the temperature in the reactor to drop slightly. The temperature was readjusted to 130° C., and during the subsequent steps the pressure in the reactor was held at 15 bar by further additions of $CO_2$. 1.74 g of propylene oxide were metered in using an HPLC pump (1 ml/min) and the reaction mixture was stirred (800 rpm) for 20 minutes. The appearance of a briefly increased evolution of heat in the reactor during this time indicated the activation of the catalyst. Subsequently a further 1.74 g of propylene oxide were metered in by means of the HPLC pump (1 ml/min) and the reaction mixture was stirred for 20 minutes (800 rpm). The occurrence of a briefly increased evolution of heat in the reactor during this time confirmed the activation of the catalyst.

[Step (δ)]

After cooling to 100° C. had taken place, 45.4 g of propylene oxide were metered in by an HPLC pump (1 ml/min) with further stirring (800 rpm).

After the end of the addition of propylene oxide, the reaction mixture was stirred for a further 2 hours at 100° C. The reaction was ended by cooling of the reactor in an ice bath, and the elevated pressure was let down and the resulting product was analyzed.

Analysis of the reaction mixture by NMR spectroscopy showed complete conversion of the propylene oxide ($R_{PO}$=0%).

| Selectivity | g/e | 0.10 |
|---|---|---|
| | e/f ($A_{carbonate}$) | 0.20 |
| | | (16.4% carbonate units in the PEC) |
| $A_{BADGE}$ in % | | 0 |
| Molecular weight | $M_n$ | 2846 |
| in g/mol | $M_w$ | 3585 |
| Polydispersity | | 1.26 |
| OH number in $mg_{KOH}$/g | | 67.7 |

| Viscosity in mPa · s | 1680 |
|---|---|
| Gel point in min | 10.5 |

Comparison of Examples 1-3

| Example | Addition of the branching agent molecule | Functionality of the product | Viscosity mPa · s | Gel point min |
|---|---|---|---|---|
| 1 | Early addition | 2.7 | 1065 | 7.6 |
| 2 | Late addition | 2.7 | 1269 | 8.4 |
| 3 (comp.) | — | 2 | 1680 | 10.5 | comp.: Comparative example

The comparison of example 1 with example 2 shows that the early addition of branching agent molecules is advantageous, since a lower viscosity and a higher reactivity toward isocyanates (shorter time until the gel point is reached) are achieved.

Contrasting example 1 with comparative example 3 shows that the higher-functionality polyethercarbonate polyol has a lower viscosity and higher reactivity (shorter time until the gel point is reached) in comparison to the linear polyethercarbonate polyol.

Example 4

Higher-Functionality Polyethercarbonate Polyol Having as Arithmetic Functionality of 2.5, Obtained by "Early Addition" of BADGE

[Step (α)]

A 300 ml pressure reactor equipped with gas introduction stirrer was charged with a mixture of DMC catalyst (16 mg) and PET-1 (10 g) and stirred for 30 minutes at 130° C. under a gentle vacuum (50 mbar) and gentle Ar stream (700 rpm).

[Step (β)]

15 bar of $CO_2$ were injected, causing the temperature in the reactor to drop slightly. The temperature was readjusted to 130° C., and during the subsequent steps the pressure in the reactor was held at 15 bar by further additions of $CO_2$. 3.5 g of propylene oxide were metered in using an HPLC pump (1 ml/min) and the reaction mixture was stirred (700 rpm) for 20 minutes. The appearance of a briefly increased evolution of heat in the reactor during this time indicated the activation of the catalyst. Subsequently a further two portions each of 3.5 g of propylene oxide were metered in by means of the HPLC pump (1 ml/min) and the reaction mixture was stirred for 20 minutes (700 rpm). The occurrence of a briefly increased evolution of heat in the reactor during this time confirmed the activation of the catalyst.

[Step (γ)]

After cooling to 100° C. had taken place, a mixture of 1.36 g (4 mmol) of bisphenol A diglycidyl ether in solution in 12.24 g of propylene oxide was metered in by an HPLC pump (1 ml/min), the reaction mixture being stirred further (700 rpm).

[Step (δ)]

Immediately thereafter, with further stirring (800 rpm), a further 46.9 g of propylene oxide were metered in via an HPLC pump (1 ml/min). After the end of the addition of propylene oxide, the reaction mixture was stirred for a further 2 hours at 100° C. The reaction was ended by cooling of the reactor in an ice bath, and the elevated pressure was let down and the resulting product was analyzed.

Analysis of the reaction mixture by NMR spectroscopy showed complete conversion of the propylene oxide ($R_{PO}$=0%) and of the BADGE ($R_{BADGE}$=0%).

| Selectivity | g/e | 0.08 |
|---|---|---|
| | e/f ($A_{carbonate}$) | 0.25 |
| | | (17.6% carbonate units in the PEC) |
| $A_{BADGE}$ in % | | 0.33 |
| Molecular weight | $M_n$ | 5699 |
| in g/mol | $M_w$ | 13 797 |
| Polydispersity | | 2.42 |
| OH number in $mg_{KOH}$/g | | 28.5 |
| Viscosity in mPa · s | | 4069 |
| Gel point in min | | 17.3 |

Example 5

Higher-Functionality Polyethercarbonate Polyol Having an Arithmetic Functionality of 2.5, Obtained by "Late Addition" of BADGE

[Step (α)]

S A 300 ml pressure reactor equipped with gas introduction stirrer was charged with a mixture of DMC catalyst (16 mg) and PET-1 (10 g) and stirred for 30 minutes at 130° C. under a gentle vacuum (50 mbar) and gentle Ar stream (700 rpm).

[Step (β)]

15 bar of $CO_2$ were injected, causing the temperature in the reactor to drop slightly. The temperature was readjusted to 130° C., and during the subsequent steps the pressure in the reactor was held at 15 bar by further additions of $CO_2$. 3.5 g of propylene oxide were metered in using an HPLC pump (1 ml/min) and the reaction mixture was stirred (700 rpm) for 20 minutes. The appearance of a briefly increased evolution of heat in the reactor during this time indicated the activation of the catalyst. Subsequently two further portions each of 3.5 g of propylene oxide were metered in by means of the HPLC pump (1 ml/min) and the reaction mixture was stirred for 20 minutes (700 rpm). The occurrence of a briefly increased evolution of heat in the reactor during this time confirmed the activation of the catalyst.

[Step (δ)]

After cooling to 100° C. had taken place, a further 45.26 g of propylene oxide were metered in by an HPLC pump (1 ml/min) with further stirring (700 rpm).

[Step (γ)]

Immediately thereafter, with stirring, a mixture of 1.36 g (4 mmol) of bisphenol A diglycidyl ether in solution in 12.24 g of propylene oxide and also, subsequently, a further 2 g of propylene oxide were metered in by an HPLC pump (1 ml/min), the reaction mixture being stirred further (700 rpm). After the end of the addition of propylene oxide, the reaction mixture was stirred for a further 2 hours at 100° C. The reaction was ended by cooling of the reactor in an ice bath, and the elevated pressure was let down and the resulting product was analyzed.

Analysis of the reaction mixture by NMR spectroscopy showed complete conversion of the propylene oxide ($R_{PO}$=0%) and the BADGE ($R_{BADGE}$=0%).

| Selectivity | g/e | 0.07 |
|---|---|---|
| | e/f ($A_{carbonate}$) | 0.23 |
| | | (20.0% carbonate units in the PEC) |
| $A_{BADGE}$ in % | | 0.29 |
| Molecular weight | $M_n$ | 6115 |
| in g/mol | $M_w$ | 22 396 |
| Polydispersity | | 3.32 |
| OH number in $mg_{KOH}$/g | | 29.3 |
| Viscosity in mPa · s | | 9749 |
| Gel point in min | | 20.7 |

Comparative Example 6

Unbranched, Linear Polyethercarbonate Polyol Having a Functionality of 2.0

[Step (α)]

A 300 ml pressure reactor equipped with gas introduction stirrer was charged with a mixture of DMC catalyst (16 mg) and PET-1 (10 g) and stirred for 30 minutes at 130° C. under a gentle vacuum (50 mbar) and gentle Ar stream (700 rpm).

[Step (β)]

15 bar of $CO_2$ were injected, causing the temperature in the reactor to drop slightly. The temperature was readjusted to 130° C., and during the subsequent steps the pressure in the reactor was held at 15 bar by further additions of $CO_2$. 3.5 g of propylene oxide were metered in using an HPLC pump (1 ml/min) and the reaction mixture was stirred (700 rpm) for 20 minutes. The appearance of a briefly increased evolution of heat in the reactor during this time indicated the activation of the catalyst. Subsequently two further portions each of 3.5 g of propylene oxide were metered in by means of the HPLC pump (1 ml/min) and the reaction mixture was stirred for 20 minutes (700 rpm). The occurrence of a briefly increased evolution of heat in the reactor during this time confirmed the activation of the catalyst.

[Step (δ)]

After cooling to 100° C. had taken place, 59.5 g of propylene oxide were metered in by an HPLC pump (1 ml/min) with further stirring (700 rpm). After the end of the addition of propylene oxide, the reaction mixture was stirred for a further 2 hours at 100° C. The reaction was ended by cooling of the reactor in an ice bath, and the elevated pressure was let down and the resulting product was analyzed.

Analysis of the reaction mixture by NMR spectroscopy showed complete conversion of the propylene oxide ($R_{PO}$=0%).

| Selectivity | g/e | 0.07 |
|---|---|---|
| | e/f ($A_{carbonate}$) | 0.26 |
| | | (20.7% carbonate units in the PEC) |
| Molecular weight | $M_n$ | 6329 |
| in g/mol | $M_w$ | 14 082 |
| Polydispersity | | 2.22 |
| OH number in $mg_{KOH}$/g | | 28.4 |
| Viscosity in mPa · s | | 6980 |
| Gel point in min | | 25.6 |

Comparison of Examples 4-6

| Example | Addition of the branching agent molecule | Functionality of the product | Viscosity mPa · s | Gel point min |
|---|---|---|---|---|
| 4 | Early addition | 2.5 | 4069 | 17.3 |
| 5 | Late addition | 2.5 | 9749 | 20.7 |
| 6 (comp.) | — | 2 | 6980 | 25.6 |

The comparison of example 4 with example 5 shows that the early addition of branching agent molecules is advantageous, since a lower viscosity and a higher reactivity toward isocyanates (shorter time until the gel point is reached) are achieved.

Contrasting example 4 with comparative example 6 shows that the higher-functionality polyethercarbonate polyol has a lower viscosity and higher reactivity (shorter time until the gel point is reached) in comparison to the linear polyethercarbonate polyol.

Example 7

Higher-Functionality Polyethercarbonate Polyol Having an Arithmetic Functionality of 2.8, Obtained by "Early Addition" of BADGE

[Step (α)]

A 300 ml pressure reactor equipped with gas introduction stirrer was charged with a mixture of DMC catalyst (16 mg) and PET-1 (8.7 g) and stirred for 30 minutes at 130° C. under a gentle vacuum (50 mbar) and gentle Ar stream (700 rpm).

[Step (β)]

15 bar of $CO_2$ were injected, causing the temperature in the reactor to drop slightly. The temperature was readjusted to 130° C., and during the subsequent steps the pressure in the reactor was held at 15 bar by further additions of $CO_2$. 3.5 g of propylene oxide were metered in using an HPLC pump (1 ml/min) and the reaction mixture was stirred (700 rpm) for 20 minutes. The appearance of a briefly increased evolution of heat in the reactor during this time indicated the activation of the catalyst. Subsequently a further two portions each of 3.5 g of propylene oxide were metered in by means of the HPLC pump (1 ml/min) and the reaction mixture was stirred for 20 minutes (700 rpm). The occurrence of a briefly increased evolution of heat in the reactor during this time confirmed the activation of the catalyst.

[Step (γ)]

After cooling to 100° C. had taken place, a mixture of 1.93 g (4 mmol) of bisphenol A diglycidyl ether in solution in 16.04 g of propylene oxide was metered in with stirring (700 rpm) by an HPLC pump (1 ml/min).

[Step (δ)]

Immediately thereafter, with further stirring (700 rpm), a further 44.5 g of propylene oxide were metered in via an HPLC pump (1 ml/min). After the end of the addition of propylene oxide, the reaction mixture was stirred for a further 2 hours at 100° C. The reaction was ended by cooling of the reactor in an ice bath, and the elevated pressure was let down and the resulting product was analyzed Analysis of the reaction mixture by NMR spectroscopy showed complete conversion of the propylene oxide ($R_{PO}$=0%) and of the BADGE ($R_{BADGE}$=0%).

| Selectivity | g/e | | 0.12 |
|---|---|---|---|
| | e/f ($A_{carbonate}$) | | 0.27 |
| | | | (21.4% carbonate units in the PEC) |
| $A_{BADGE}$ in % | | | 0.42 |
| Molecular weight | $M_n$ | | 5112 |
| in g/mol | $M_w$ | | 13 797 |
| Polydispersity | | | 1.89 |
| OH number in mg$_{KOH}$/g | | | 28.8 |
| Viscosity in mPa · s | | | 5149 |
| Gel point in min | | | 13.3 |

Example 8

Higher-Functionality Polyethercarbonate Polyol Having an Arithmetic Functionality of 2.8, Obtained by "Late Addition" of BADGE

[Step (α)]

A 300 ml pressure reactor equipped with gas introduction stirrer was charged with a mixture of DMC catalyst (16 mg) and PET-1 (8.7 g) and stirred for 30 minutes at 130° C. under a gentle vacuum (50 mbar) and gentle Ar stream (700 rpm).

[Step (β)]

15 bar of $CO_2$ were injected, causing the temperature in the reactor to drop slightly. The temperature was readjusted to 130° C., and during the subsequent steps the pressure in the reactor was held at 15 bar by further additions of $CO_2$. 3.5 g of propylene oxide were metered in using an HPLC pump (1 ml/min) and the reaction mixture was stirred (700 rpm) for 20 minutes. The appearance of a briefly increased evolution of heat in the reactor during this time indicated the activation of the catalyst. Subsequently two further portions each of 3.5 g of propylene oxide were metered in by means of the HPLC pump (1 ml/min) and the reaction mixture was stirred for 20 minutes (700 rpm). The occurrence of a briefly increased evolution of heat in the reactor during this time confirmed the activation of the catalyst.

[Step (δ)]

After cooling to 100° C. had taken place, a further 40.7 g of propylene oxide were metered in by an HPLC pump (1 ml/min) with further stirring (700 rpm).

[Step (γ)]

Immediately thereafter, with stirring, a mixture of 1.92 g (4 mmol) of bisphenol A diglycidyl ether in solution in 16.14 g of propylene oxide and also, subsequently, a further 3.9 g of propylene oxide were metered in by an HPLC pump (1 ml/min), the reaction mixture being stirred further (700 rpm). After the end of the addition of propylene oxide, the reaction mixture was stirred for a further 2 hours at 100° C. The reaction was ended by cooling of the reactor in an ice bath, and the elevated pressure was let down and the resulting product was analyzed.

Analysis of the reaction mixture by NMR spectroscopy showed complete conversion of the propylene oxide ($R_{PO}$=0%) and of the BADGE ($R_{BADGE}$=0%).

| Selectivity | g/e | | 0.11 |
|---|---|---|---|
| | e/f ($A_{carbonate}$) | | 0.27 |
| | | | (21.0% carbonate units in the PEC) |
| $A_{BADGE}$ in % | | | 0.39 |
| Molecular weight | $M_n$ | | 4986 |
| in g/mol | $M_w$ | | 17 600 |
| Polydispersity | | | 3.53 |
| OH number in mg$_{KOH}$/g | | | 29.3 |

-continued

| | |
|---|---|
| Viscosity in mPa · s | 14 630 |
| Gel point in min | 17.0 |

Comparison of Examples 6-8

| Example | Addition of the branching agent molecule | Functionality of the product | Viscosity mPa · s | Gel point min |
|---|---|---|---|---|
| 7 | Early addition | 2.8 | 5149 | 13.3 |
| 8 | Late addition | 2.8 | 14 630 | 17.0 |
| 6 (comp.) | — | 2 | 6980 | 25.6 |

The comparison of example 7 with example 8 shows that the early addition of branching agent molecules is advantageous, since a lower viscosity and a higher reactivity toward isocyanates (shorter time until the gel point is reached) are achieved.

Contrasting example 7 with comparative example 6 shows that the higher-functionality polymer has a lower viscosity and higher reactivity (shorter time until the gel point is reached) in comparison to the linear polymer.

Example 9

Higher-Functionality Polyethercarbonate Polyol Having an Arithmetic Functionality of 2.5, Obtained by "Early Addition" of DED

[Step (α)]
A 300 ml pressure reactor equipped with gas introduction stirrer was charged with a mixture of DMC catalyst (16 mg) and PET-1 (10 g) and stirred for 30 minutes at 130° C. under a gentle vacuum (50 mbar) and gentle Ar stream (700 rpm).

[Step (β)]
15 bar of $CO_2$ were injected, causing the temperature in the reactor to drop slightly. The temperature was readjusted to 130° C., and during the subsequent steps the pressure in the reactor was held at 15 bar by further additions of $CO_2$. 3.5 g of propylene oxide were metered in using an HPLC pump (1 ml/min) and the reaction mixture was stirred (700 rpm) for 20 minutes. The appearance of a briefly increased evolution of heat in the reactor during this time indicated the activation of the catalyst. Subsequently a further two portions each of 3.5 g of propylene oxide were metered in by means of the HPLC pump (1 ml/min) and the reaction mixture was stirred for 20 minutes (700 rpm). The occurrence of a briefly increased evolution of heat in the reactor during this time confirmed the activation of the catalyst.

[Step (γ)]
After cooling to 100° C. had taken place, a mixture of 0.68 g (4 mmol) of 1,2,9,10-diepoxydecane in solution in 6.23 g of propylene oxide was metered in by an HPLC pump (1 ml/min), the reaction mixture being stirred further (700 rpm).

[Step (δ)]
Immediately thereafter, with further stirring (700 rpm), a further 53.5 g of propylene oxide were metered in via an HPLC pump (1 ml/min). After the end of the addition of propylene oxide, the reaction mixture was stirred for a further 2 hours at 100° C. The reaction was ended by cooling of the reactor in an ice bath, and the elevated pressure was let down and the resulting product was analyzed.

Analysis of the reaction mixture by NMR spectroscopy showed complete conversion of the propylene oxide ($R_{PO}$=0%) and of the DED ($R_{DED}$=0%).

| | | |
|---|---|---|
| Selectivity | g/e | 0.10 |
| | e/f ($A_{carbonate}$) | 0.26 |
| | | (21.1% carbonate units in the PEC) |
| Molecular weight $M_n$ | | 6419 |
| in g/mol $M_w$ | | 15 219 |
| Polydispersity | | 2.37 |
| OH number in $mg_{KOH}$/g | | 27.8 |
| Viscosity in mPa · s | | 5461 |
| Gel point in min | | 14.3 |

Example 10

Higher-Functionality Polyethercarbonate Polyol Having an Arithmetic Functionality of 2.5, Obtained by "Late Addition" of DED

[Step (α)]
A 300 ml pressure reactor equipped with gas introduction stirrer was charged with a mixture of DMC catalyst (16 mg) and PET-1 (10 g) and stirred for 30 minutes at 130° C. under a gentle vacuum (50 mbar) and gentle Ar stream (700 rpm).

[Step (β)]
15 bar of $CO_2$ were injected, causing the temperature in the reactor to drop slightly. The temperature was readjusted to 130° C., and during the subsequent steps the pressure in the reactor was held at 15 bar by further additions of $CO_2$. 3.5 g of propylene oxide were metered in using an HPLC pump (1 ml/min) and the reaction mixture was stirred (700 rpm) for 20 minutes. The appearance of a briefly increased evolution of heat in the reactor during this time indicated the activation of the catalyst. Subsequently two further portions each of 3.5 g of propylene oxide were metered in by means of the HPLC pump (1 ml/min) and the reaction mixture was stirred for 20 minutes (700 rpm). The occurrence of a briefly increased evolution of heat in the reactor during this time confirmed the activation of the catalyst.

[Step (δ)]
After cooling to 100° C. had taken place, a further 51.74 g of propylene oxide were metered in by an HPLC pump (1 ml/min) with further stirring (700 rpm).

[Step (γ)]
Immediately thereafter, with stirring, a mixture of 0.68 g (4 mmol) of 1,2,9,10-diepoxydecane in solution in 6.20 g of propylene oxide and also, subsequently, a further 2 g of propylene oxide were metered in by an HPLC pump (1 ml/min), the reaction mixture being stirred further (700 rpm). After the end of the addition of propylene oxide, the reaction mixture was stirred for a further 2 hours at 100° C. The reaction was ended by cooling of the reactor in an ice bath, and the elevated pressure was let down and the resulting product was analyzed.

Analysis of the reaction mixture by NMR spectroscopy showed complete conversion of the propylene oxide ($R_{PO}$=0%) and of the DED ($R_{DED}$=0%).

| | | |
|---|---|---|
| Selectivity | g/e | 0.11 |
| | e/f ($A_{carbonate}$) | 0.29 |
| | | (22.7% carbonate units in the PEC) |

-continued

| | |
|---|---|
| Molecular weight $M_n$ in g/mol | 4811 |
| $M_w$ | 19 664 |
| Polydispersity | 4.08 |
| OH number in $mg_{KOH}/g$ | 27.2 |
| Viscosity in mPa · s | 14 550 |
| Gel point in min | 19.0 |

Comparison of Examples 9-10 and 6

| Example | Addition of the branching agent molecule | Functionality of the product | Viscosity mPa · s | Gel point min |
|---|---|---|---|---|
| 9 | Early addition | 2.5 | 5461 | 14.3 |
| 10 | Late addition | 2.5 | 14 550 | 19.0 |
| 6 (comp.) | — | 2 | 6980 | 25.6 |

The comparison of example 9 with example 10 shows that the early addition of the branching agent molecules is advantageous, because the viscosity is lower and the reactivity toward isocyanates is higher (shorter time until the gel point is reached).

Contrasting example 9 with comparative example 6 shows that in comparison to the linear polymer, the higher-functionality polymer has a lower viscosity and higher reactivity (shorter time until the gel point is reached).

The invention claimed is:

1. A process for preparing polyethercarbonate polyols of relatively high functionality comprising reacting at least two alkylene oxides and carbon dioxide with H-functional starter compounds in the presence of a double metal cyanide catalyst, comprising the steps of
    (α) initially introducing a double metal cyanide catalyst and
        (αα) a suspension medium that contains no H-functional groups, and/or
        (αβ) an H-functional starter compound,
    (γ) metering in carbon dioxide and at least two alkylene oxides and
    (δ) metering in carbon dioxide and at least one alkylene oxide, wherein the alkylene oxide(s) are identical or different from the alkylene oxides metered in step (γ),
    wherein at least one of the alkylene oxides in step (γ) having an epoxy functionality of ≥2 is selected from the group consisting of BAGE bisphenol A diglycidyl ether and DED 1,2,9,10-diepoxydecane, and
    wherein, if no H-functional starter compound was introduced in step (α), step (δ) comprises the metering of an H-functional starter compound.

2. The process as claimed in claim 1, further comprising step (β) between step (α) and step (γ):
    (β) metering in carbon dioxide and at least one alkylene oxide,
    and wherein at least two alkylene oxides metered in step (γ) are identical or different from the alkylene oxide or alkylene oxides metered in step (β), and wherein the alkylene oxide(s) metered in step (δ) are identical or different from the alkylene oxides metered in step (β) and (γ).

3. The process as claimed in any of claims 1, wherein the polyethercarbonate polyol according to formula (Ia) has an e/f ratio of 2:1 to 1:20,

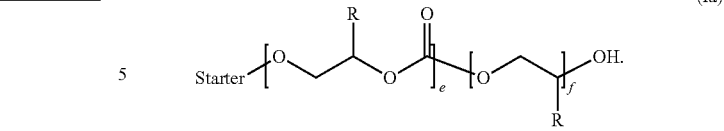

4. The process as claimed in claim 1, wherein at least one of the alkylene oxides having an epoxy functionality of ≥2 in step (γ) is a compound of formula (I),

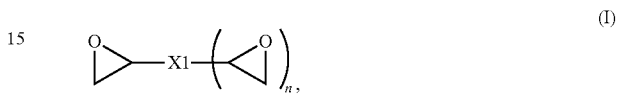

where X1 is a chemical bond or a di- or multivalent, heteroatom-containing or non-heteroatom-containing C5-C22 aliphatic, aromatic, araliphatic or cycloaliphatic radical and n is an integer ≥1.

5. The process as claimed in claim 1, wherein at least one of the alkylene oxides having an epoxy functionality of ≥2 in step (γ) is a compound of formula (II),

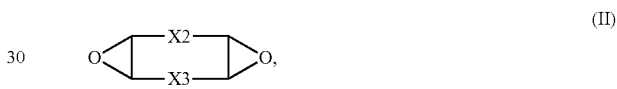

where X2 and X3 independently of one another are a chemical bond or are heteroatom-containing or non-heteroatom-containing C5-C22 aliphatic, aromatic, araliphatic or cycloaliphatic radicals.

6. The process as claimed in claim 1, wherein at least one of the alkylene oxides having an epoxy functionality of ≥2 in step (γ) is a compound of formula (III),

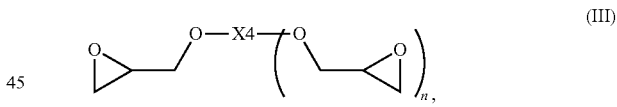

where X4 is a di- or polyvalent, heteroatom-containing or non-heteroatom-containing C5-C22 aliphatic, aromatic, araliphatic or cycloaliphatic radical and n is an integer ≥1.

7. The process as claimed in claim 1, wherein the addition of the alkylene oxide or oxides having an epoxy functionality of ≥2 in step (γ) is concluded before 50 mol% of the total amount of alkylene oxides has been added.

8. The process as claimed in claim 1, wherein at least the step (δ) is carried out continuously.

9. The process as claimed in claim 1, comprising continuously metering an H-functional starter compound in step (δ).

10. The process as claimed in claim 1, comprising discontinuously metering an H-functional starter compound in step (δ).

11. The process as claimed in claims 1, wherein the polyethercarbonate polyol of relatively high functionality is reacted, in an additional process step, with di- and/or polyisocyanates.

12. A polyethercarbonate polyol of relatively high functionality, obtained by the process as claimed in claim 1.

13. A crosslinked polyethercarbonate polymer obtained by the process as claimed in claim 11.

14. A article comprising the crosslinked polyethercarbonate polymer as claimed in claim 13 wherein the article is a thermoset solids, viscoelastic foams or coatings.

15. The process as claimed in claim 1, wherein the at least one of the alkylene oxides in step (γ) having an epoxy functionality of ≥2 is added before more than half of the total alkylene oxides has been added.

16. The process as claimed in claim 1, wherein the at least one of the alkylene oxides in step (γ) having an epoxy functionality of ≥2 is added before more than a quarter of the total alkylene oxides has been added.

* * * * *